US007167725B1

(12) United States Patent
Nakamura et al.

(10) Patent No.: US 7,167,725 B1
(45) Date of Patent: Jan. 23, 2007

(54) MUSIC REPRODUCING APPARATUS, MUSIC REPRODUCING METHOD AND TELEPHONE TERMINAL DEVICE

(75) Inventors: Nobukazu Nakamura, Hamakita (JP); Junya Taniguchi, Hamamatsu (JP); Yasuaki Kamiya, Iwata (JP)

(73) Assignee: Yamaha Corporation, Hamamatsu (JP)

( * ) Notice: Subject to any disclaimer, the term of this patent is extended or adjusted under 35 U.S.C. 154(b) by 603 days.

(21) Appl. No.: 10/049,351

(22) PCT Filed: Aug. 3, 2000

(86) PCT No.: PCT/JP00/05199

§ 371 (c)(1), (2), (4) Date: Jul. 22, 2002

(87) PCT Pub. No.: WO01/11603

PCT Pub. Date: Feb. 15, 2001

(30) Foreign Application Priority Data

Aug. 5, 1999 (JP) ................................ 11222319
Aug. 5, 1999 (JP) ................................ 11222320
Oct. 29, 1999 (JP) ................................ 11309408

(51) Int. Cl.
*H04B 1/38* (2006.01)

(52) U.S. Cl. .................... 455/557; 455/556.1; 84/600; 84/622

(58) Field of Classification Search ................ 455/567, 455/550.1, 566; 84/603, 622, 601, 659; 381/61, 381/63; 360/32, 48
See application file for complete search history.

(56) References Cited

U.S. PATENT DOCUMENTS 5,696,343 A 12/1997 Nagata ....................... 84/609

(Continued)

FOREIGN PATENT DOCUMENTS

EP 0 730 260 A2 4/1996

(Continued)

OTHER PUBLICATIONS

European Patent Office Search Report, dated Jun. 9, 2005.

(Continued)

*Primary Examiner*—Temica Beamer
*Assistant Examiner*—Joy Contee
(74) *Attorney, Agent, or Firm*—Pillsbury Winthrop Shaw Pittman LLP

(57) ABSTRACT

In a music reproducing apparatus, a timbre data memory has a limited capacity for storing timbre data corresponding to a first number of timbres, which is less than a second number of timbres reserved in a data source. An interface can be operated to transfer the timbre data from the data source to the timbre data memory so that the timbre data memory stores the transferred timbre data. A score data memory stores score data representing a music piece. A tone generator is set with a tone generating parameter derived from the score data stored in the score data memory for generating tones of the music piece. A performance controller interprets the score data to read out timbre data designated by the score data from the timbre data memory for setting the tone generator with the read timbre data so that the tone generator can generate the tones having timbres specified by the score data. Further, a memory monitor detects when a vacant area is created in a limited space of the score data memory upon sequential retrieval of the score data for operating the interface to load another part of the score data into the vacant area, thereby enabling the tone generator to continue the generating of the tones of the music piece.

30 Claims, 10 Drawing Sheets

U.S. PATENT DOCUMENTS 5,825,905 A * 10/1998 Kikuchi ...................... 382/113
5,892,171 A * 4/1999 Ide .............................. 84/622
6,094,587 A * 7/2000 Armanto et al. ............ 455/567
6,308,086 B1 * 10/2001 Yoshino ..................... 455/567
6,501,967 B1 * 12/2002 Makela et al. .............. 455/567

FOREIGN PATENT DOCUMENTS

| | | |
|---|---|---|
| EP | 0 827 132 A1 | 4/1998 |
| EP | 0 837 451 A | 4/1998 |
| EP | 0 817 103 A2 | 7/1998 |
| EP | 0 855 697 A1 | 12/1998 |
| JP | 04-168492 | 6/1992 |
| JP | HEI 7-181967 | 7/1995 |
| JP | 09-181795 | 7/1997 |
| KR | 1996-0019064 | 6/1996 |

OTHER PUBLICATIONS

Official Communication issued May 9, 2006 by European Patent Office in connection with a divisional application of European counterpart of present U.S. Appl.

Summons to attend Oral Proceedings issued Aug. 6, 2004 by European Patent Office in connection with the European counterpart of the present U.S. Appl.

Notice of Rejection from Japan Patent Office for Patent Appl. No. 11-222319 dated Jan. 29, 2001.

Notice of Rejection from Japan Patent Office for Patent Appl. No. 11-222319 dated Jun. 14, 2001.

Notice of Rejection from Japan Patent Office for Patent Appl. No. 11-309408 dated Jan. 29, 2001.

Notice of Rejection from Japan Patent Office for Patent Appl. No. 11-309408 dated Jun. 14, 2001

International Search Report dated Nov. 14, 2000 and Official Communications from European Patent Office for European Patent Appl. Corresponding to U.S. Appl.

Notice of Rejection from Korean Patent Office for Patent Appl. No. 10-2002-7001612 dated Apr. 9, 2004.

First Office Action from Chinese Patent Office, Issued on Mar. 19, 2004 for Chinese Patent Appl. No. 00811114.6.

OKI Semiconductor MSM9841 Data Sheet—Published Jul. 2000.

Press Release, "Development of Voice LSI for Car Navigation", Oct. 29, 1997, OKI product codes MSM9841 and MSM9842.

Quasi-Stereo ADPCM Speech LSIs MSM9841 and MSM9842, retrieved from http://www.oki.com/jp/DBG/english/msm9841.htm, no date listed.

Product Description Sheet, YMZ263B, Multimedia Audio & Game Interface Controller (MMA), Aug. 1992.

* cited by examiner

FIG.4

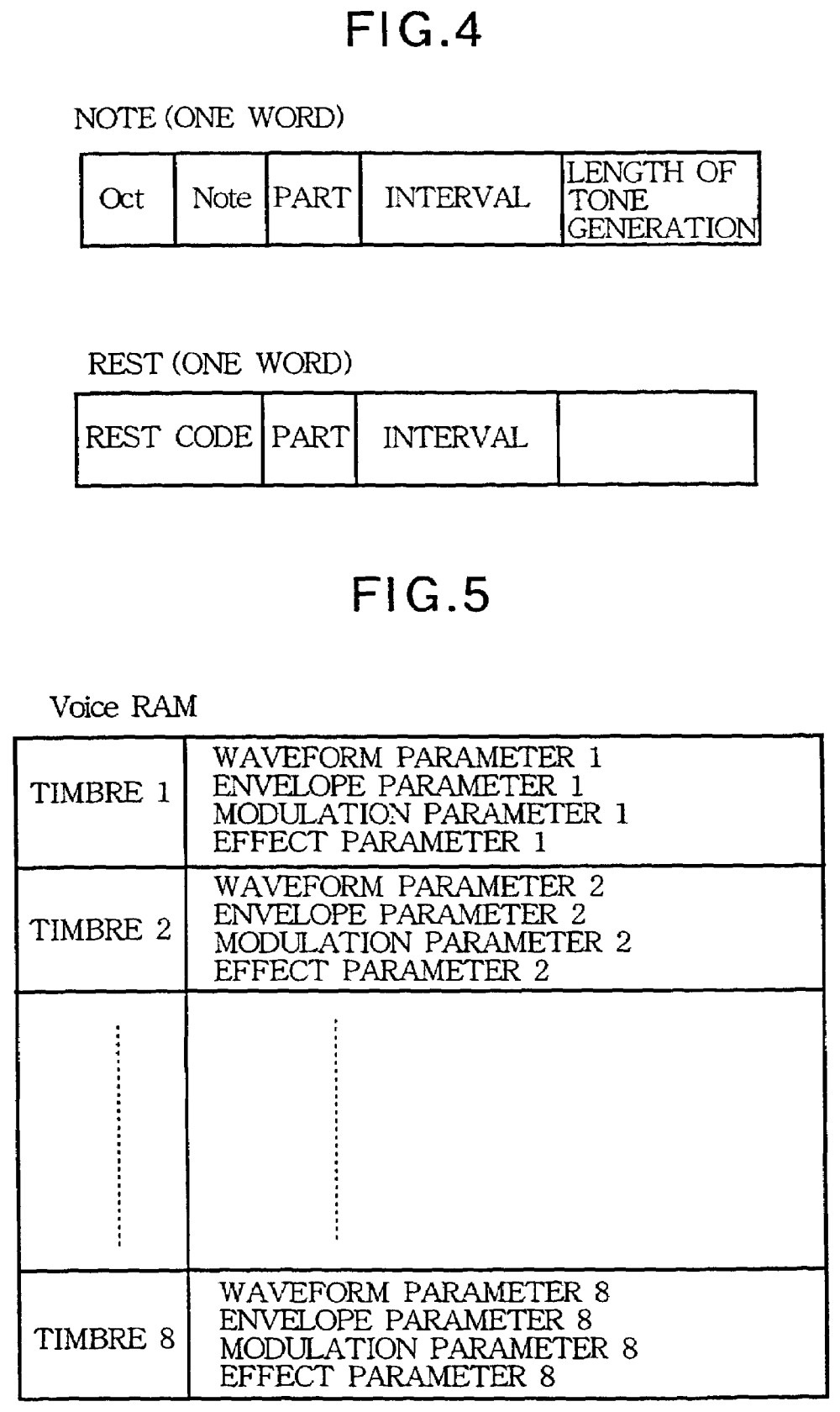

NOTE (ONE WORD)

| Oct | Note | PART | INTERVAL | LENGTH OF TONE GENERATION |
|---|---|---|---|---|

REST (ONE WORD)

| REST CODE | PART | INTERVAL | |
|---|---|---|---|

FIG.5

Voice RAM

| | |
|---|---|
| TIMBRE 1 | WAVEFORM PARAMETER 1<br>ENVELOPE PARAMETER 1<br>MODULATION PARAMETER 1<br>EFFECT PARAMETER 1 |
| TIMBRE 2 | WAVEFORM PARAMETER 2<br>ENVELOPE PARAMETER 2<br>MODULATION PARAMETER 2<br>EFFECT PARAMETER 2 |
| ⋮ | ⋮ |
| TIMBRE 8 | WAVEFORM PARAMETER 8<br>ENVELOPE PARAMETER 8<br>MODULATION PARAMETER 8<br>EFFECT PARAMETER 8 |

TIMBRE ALLOCATION DATA

| | | | |
|---|---|---|---|
| PART 1 →TIMBRE 1 | PART 2 →TIMBRE 5 | PART 3 →TIMBRE 8 | PART 4 →TIMBRE 2 |

Voice RAM

| | |
|---|---|
| TIMBRE 1 | TIMBRE DATA FOR MODULATOR |
| | TIMBRE DATA FOR CARRIER |
| TIMBRE 2 | TIMBRE DATA FOR MODULATOR |
| | TIMBRE DATA FOR CARRIER |
| ⋮ | ⋮ |
| TIMBRE 8 | TIMBRE DATA FOR MODULATOR |
| | TIMBRE DATA FOR CARRIER |

TIMBRE DATA FORMAT FOR MODULATOR AND CARRIER

- ML2-ML0 : MULTIPLE SETTING
- VIB : VIBRATO ON/OFF
- EGT : ENVELOPE GENERATOR TYPE
- SUS : SUSTAIN ON/OFF
- AR3-AR0 : ATTACK RATE SETTING
- DR3-DR0 : DECAY RATE SETTING
- SL3-SL0 : SUSTAIN LEVEL SETTING
- PR3-PR0 : RELEASE RATE SETTING
- WAV : WAVEFORM SELECTION
- FL2-FL0 : FFEEDBACK AMOUNT SETTING
- TL5-TL0 :

MUSIC REPRODUCING APPARATUS, MUSIC REPRODUCING METHOD AND TELEPHONE TERMINAL DEVICE

This application is the National Phase of International Application PCT/JP00/05199 filed 3 Aug. 2000 which designated the U.S. and that International Application was published under PCT Article 21(2) in English.

BACKGROUND OF THE INVENTION

1. Field of the Invention

The present invention relates to a music reproducing apparatus and a music reproducing method suitable for use in a car telephone or portable telephone.

2. Related Art

In portable telephone systems such as PDC (Personal Digital Cellular Telecommunication System) known as analog or digital cellular systems, or PHS (Personal Handy-Phone Systems), a telephone terminal device rings to alert a user at the time of arrival of a call. Conventionally, the alert was made by beeping sound, but it has recently replaced by a melody because the beeping sound is a kind of noise offensive to the ear.

The above-mentioned type of conventional telephone terminal device can generate a melody, but the melody is far from satisfactory quality.

To solve this problem, the use of a music piece reproducing apparatus with an automatic performance function has been considered effective. Such a conventional music piece reproducing apparatus capable of automatic performance includes a central processing unit (CPU), a read only memory (ROM), a random access memory (RAM) and a tone generator. It reproduces a piece of music as follows: The CPU executes an automatic performance program stored in the ROM to read music data from the ROM or RAM while setting tone generation parameters on the tone generator.

Such a telephone terminal device is required to be compact, low priced and multi-functional. The built-in CPU must execute various kinds of operations such as to process incoming and outgoing calls and make a display. In other words, if the music piece reproducing apparatus is used in a portable type of the telephone terminal device, the CPU must carry out reproduction of a music piece in addition to other telephony functions, and this requires a high-speed CPU. The higher the processing speed of the CPU, the more the telephone terminal device costs.

The use of a melody IC with a melody reproducing function is also known. The melody IC is constituted of a tone generator, a sequencer, a ROM for storing musical score data, and another ROM for storing timbre data. Upon receipt of a music reproduction instruction from the outside, the melody IC reproduces melody tones along musical score data read from the musical score data ROM with timbres read from the timbre data ROM. If such a melody IC is incorporated into a telephone terminal device, the CPU is not required to perform reproduction of a music piece, and this makes it possible to use an inexpensive, low-speed CPU.

The melody IC, however, has a small storage capacity for the timbre data ROM. The storage capacity of the timbre data ROM is so small that the number of parameters and kinds of timbre data are limited, and this makes it difficult to generate tones of high quality or a variety of tones.

Further, the melody IC has a small storage capacity for the musical score data ROM such that the number of storable music pieces and the length of a music piece to be reproduced are limited. The storage capacity of the musical score data ROM is so small that a large amount of music data needed for reproducing a music piece of high quality cannot be stored, thereby prohibiting all but some melodies of low quality from being reproduced.

OBJECTS AND SUMMARY OF THE INVENTION

In consideration of these circumstances, it is an object of the present invention to provide a music piece reproducing apparatus and a music piece reproducing method that enable music pieces to be reproduced with a variety of timbres even though a memory for storing timbre data has a small storage capacity.

It is another object of the present invention to provide a music piece reproducing apparatus and a music piece reproducing method that enable music pieces to be reproduced with a variety of timbres even though a memory for storing music score data has a small storage capacity.

It is a further object of the present invention to provide a music piece reproducing apparatus, a music piece reproducing method, and a telephone terminal device, by which music pieces with tones of high quality can be reproduced even with a low-speed processing unit.

In order to achieve the above noted objects, an inventive music reproducing apparatus comprises a timbre data memory that has a limited capacity for storing timbre data corresponding to a first number of timbres, which is less than a second number of timbres reserved in a data source, an interface that can be operated to transfer the timbre data from the data source to the timbre data memory so that the timbre data memory stores the transferred timbre data, a score data memory that stores score data representing a music piece, a tone generator that is set with a tone generating parameter derived from the score data stored in the score data memory for generating tones of the music piece, and a performance controller that interprets the score data to read out timbre data designated by the score data from the timbre data memory for setting the tone generator with the read timbre data so that the tone generator can generate the tones having timbres specified by the score data.

Preferably, the tone generator can concurrently generate a third number of tones allotted to respective parts of the music piece, which are not more than the second number of timbres available by the timbre data memory, and the performance controller reads out timbre data corresponding to the third member of timbres which are assigned to the respective parts according to the score data.

An inventive electronic apparatus comprises a processor that processes data to execute a task, a memory device that memorizes data including music data comprised of timbre data and score data to represent music pieces, and a music reproduction device that operates according to the music data under control by the processor to reproduce a music piece in association with the task executed by the processor, wherein the music reproduction device comprises a timbre data memory that has a limited capacity for storing timbre data corresponding to a first number of timbres, which is less than a second number of timbres reserved in the memory device, an interface that can be operated to transfer the timbre data from the memory device to the timbre data memory so that the timbre data memory stores the transferred timbre data, a score data memory that stores score data representing a music piece, a tone generator that is set with a tone generating parameter derived from the score data stored in the score data memory for generating tones of the music piece, and a performance controller that interprets the score data to read out timbre data designated by the score data from the timbre data memory for setting the tone generator with the read timbre data so that the tone generator can generate the tones having timbres specified by the score data.

Preferably, the tone generator can concurrently generate a third number of tones allotted to respective parts of the music piece, which are not more than the second number of timbres available by the timbre data memory, and the performance controller reads out timbre data corresponding to the third member of timbres which are assigned to the respective parts according to the score data.

Preferably, the inventive electronic apparatus further comprises a communication device that can communicate with an external database to download therefrom music data into the memory device.

An inventive telephony terminal apparatus comprises a communication unit that transmits a signal to a remote location and receives a signal from the remote location, and a music reproduction unit that can reproduce a music piece in association with the signal, wherein the music reproduction unit comprises a score data memory that memorizes score data representing a music piece, a tone generator of a frequency modulation type settable with parameters for generating harmonics by frequency modulation to synthesize a tone, and a performance controller that sets the tone generator with parameters according to the memorized score data for enabling the tone generator to synthesize tones of the music piece represented by the score data.

Preferably, the music reproduction unit further comprises a timbre data memory that has a limited capacity for memorizing timbre data corresponding to a predetermined number of timbres, and the performance controller interprets the score data to read out timbre data corresponding to a timbre designated by the score data from the timbre data memory, and sets the tone generator according to the read timbre data to thereby enable the tone generator to synthesize the tones of the music piece having the timbre designated by the score data.

Preferably, the music reproduction unit further comprises an interface that can transfer data including the timbre data between the music reproduction unit and other units, the interface being operated for transferring the timbre data to the music reproduction unit so as to load the timbre data memory.

Preferably, the inventive telephony terminal apparatus further comprises a central processing unit that treats various data and a memory unit that reserves various data including music data composed of score data and timbre data, wherein the interface is operated under control by the central processing unit for transferring the timbre data from the memory unit to the timbre data memory of the music reproduction unit and for transferring the score data from the memory unit to the score data memory of the music reproduction unit.

Preferably, the memory unit reserves timbre data corresponding to a first number of timbres, wherein the timbre data memory of the music reproduction unit memorizes timbre data being transferred from the memory unit and corresponding to a second number of timbres which are less than the first number of timbres, wherein the tone generator can concurrently generate a third number of tones allotted to respective parts of the music piece, which are not more than the second number of timbres available by the timbre data memory, and wherein the performance controller reads out timbre data from the timbre data memory corresponding to the third member of timbres which are assigned to the respective parts according to the score data.

Preferably, the communication unit can receive a signal representing either of the score data and the timbre data so as to download the same into the memory unit.

An inventive music reproducing apparatus comprises a score data memory that has a limited space for storing a part of score data, which represents a music piece and which can be provided from a data source, an interface that can be operated to load the score data from the data source into the score data memory, a tone generator that is set with a variable parameter derived from the score data for sequentially generating tones of the music piece, a performance controller that sequentially retrieves the score data from the score data memory so as to set the tone generator with the variable parameter according to the retrieved score data, and a memory monitor that detects when a vacant area is created in the limited space of the score data memory upon sequential retrieval of the score data for operating the interface to load another part of the score data into the vacant area, thereby enabling the tone generator to continue the generating of the tones of the music piece.

Preferably, the inventive music reproducing apparatus further comprises a timbre data memory that stores timbre data corresponding to a number of timbres, wherein the performance controller reads out timbre data corresponding to a timbre designated by the score data from the timbre data memory, and sets the tone generator with the read timbre data, thereby enabling the tone generator to generate the tones of the music piece having the designated timbre.

An inventive electronic apparatus comprises a processor that processes data to execute a task, a memory device that memorizes data including score data representative of a music piece, and a music reproduction device that operates according to the score data under control by the processor to reproduce a music piece in association with the task, wherein the music reproduction device comprises a score data memory that has a limited space for storing a part of score data, which represents a music piece and which can be provided from the memory device, an interface that can be operated to load the score data from the memory device into the score data memory, a tone generator that is set with variable parameter derived from the score data for sequentially generating tones of the music piece, a performance controller that sequentially retrieves the score data from the score data memory so as to set the tone generator with the variable parameter according to the retrieved score data, and a memory monitor that notifies the processor when a vacant area is created in the limited space of the score data memory upon sequential retrieval of the score data, so that the processor operates the interface to load another part of the score data from the memory device into the vacant area of the limited space of the score data memory, thereby enabling the tone generator to continue the generating of the tones of the music piece.

Preferably, the inventive electronic apparatus further comprises a timbre data memory that stores timbre data corresponding to a number of timbres, wherein the performance controller reads out timbre data corresponding to a timbre designated by the score data from the timbre data memory, and sets the tone generator with the read timbre data, thereby enabling the tone generator to generate the tones of the music piece having the designated timbre.

Preferably, the inventive electronic apparatus further comprises a communication device that can communicate with an external database to download therefrom score data into the memory device.

According to one aspect of the present invention, timbre data transferred through the interface are stored into the timbre data storage means, the storage capacity of which is available only for required kinds of timbre data, so that the data amount for parameters in the timbre data can be large enough to obtain tones of high quality even if the timbre data storage means has a small storage capacity, thereby reproducing a piece of music with tones of high quality.

Further, among the many kinds of timbre data stored in the storage means provided outside the music piece reproducing apparatus, only the timbre data necessary to reproduce a piece of music are transferred to the music piece reproducing apparatus and stored in the timbre data storage means, so that several kinds of timbre data can be selected for tones with which the piece of music is to be reproduced even though the storage capacity of the timbre data storage means is small. In addition, if the timbre data are downloaded to an external storage means through a communication line, a choice of timbre data can be widened.

All the data processing means has to do is to read desired timbre data and to send the same to the music piece reproducing apparatus; it is not required to carry out reproduction of a piece of music. This allows music of high quality to be reproduced even with a low-speed processing unit.

In addition, if the tone generator of the music piece reproducing apparatus provided in a telephone terminal device is adopting a frequency modulating method, the amount of timbre data required for the frequency modulation type of the tone generator can be extremely reduced compared to that of a waveform memory type of the tone generator (PCM tone generator). Therefore, even if the timbre data is transmitted through a low-speed transmission path, for example, due to low speed of data processing by the data processing means, the telephone terminal device can reproduce a piece of music with a variety of tones of high quality. Further, since the amount of timbre data is reduced, timbre data enough to reproduce a piece of music with tones of high quality can be stored even in a timbre data storage means, the storage capacity of which is smaller.

According to another aspect of the present invention, when a vacant area is created in the musical score storing memory, a next portion of the musical score data is subsequently loaded into the memory. By such a construction, a music piece of a high quality requiring a great data volume can be reproduced even though the music score storing memory has a small capacity.

Further, the CPU is not required to execute the music reproduction process, but simply executes a data transfer process of feeding a next portion of the music score data when a vacant area is yielded in the memory buffering the music score data. Therefore, the CPU of moderate speed may be sufficient to reproduce the high quality of the melody tones.

BRIEF DESCRIPTION OF THE DRAWINGS

By way of example and to make the description more clear, reference is made to the accompanying drawings, in which:

FIG. 4 is a diagram showing an example of a musical score data format used in the music piece reproducing apparatus according to the embodiment of the present invention;

FIG. 5 is a diagram showing an example of a timbre data format for eight tone colors written in a timbre data storage unit (Voice RAM) in the music piece reproducing apparatus according to the embodiment of the present invention;

DETAILED DESCRIPTION OF THE INVENTION

Figure 1:
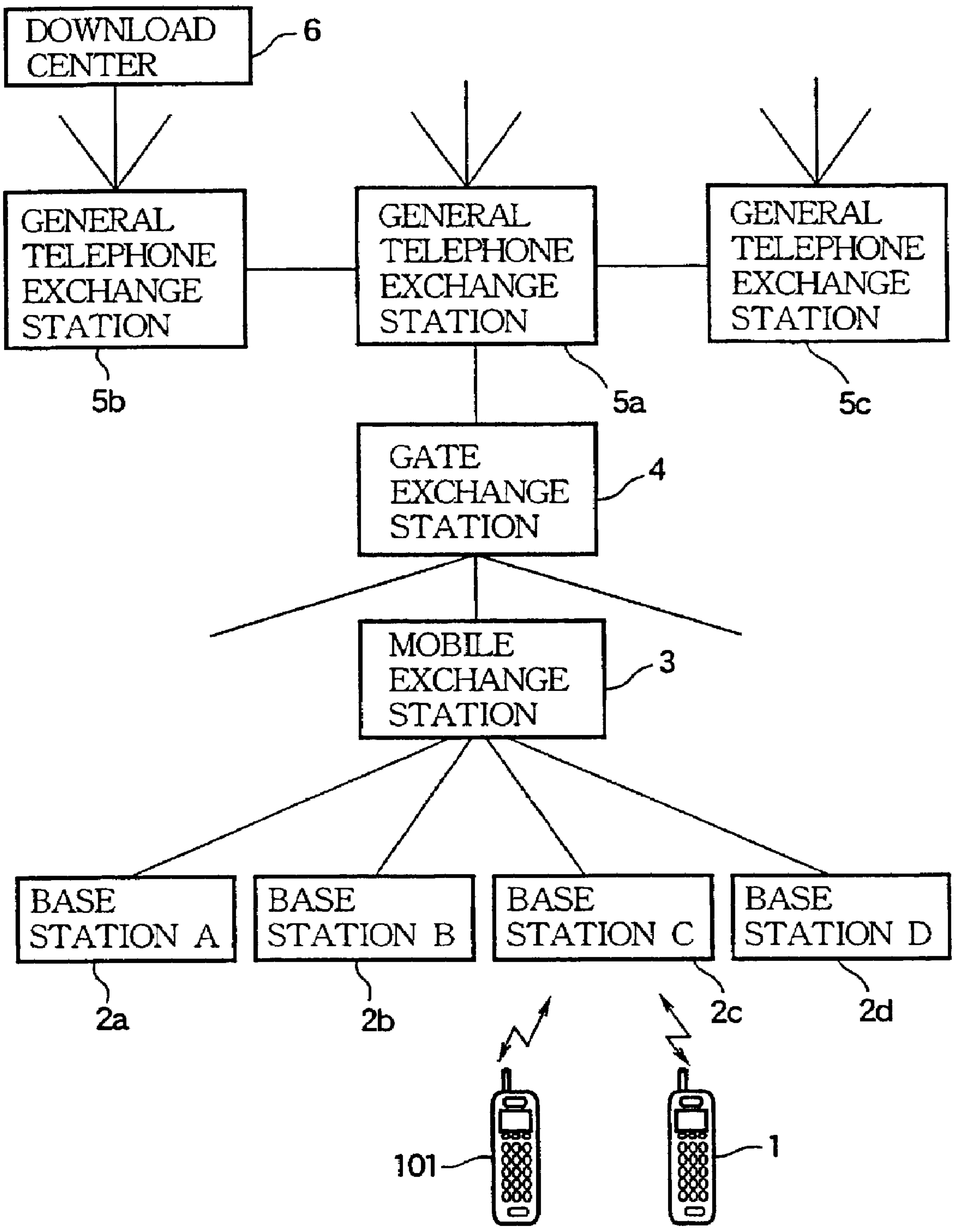
FIG. 1 is a diagram showing the concept of how to download music data to portable telephones when a music piece reproducing apparatus of the present invention that embodies a music piece reproducing method of the present invention is applied to the portable telephones.

FIG. 1 is a diagram showing the concept of how to download music data to portable telephones as telephone terminal devices when a music piece reproducing apparatus of the present invention that embodies a music piece reproducing method of the present invention is applied to the portable telephones.

Systems for portable telephones are typically adopting cellular or cell splitting methods that install many radio-zones called cells in a service area. Each radio-zone is managed by one of cell sites or base stations A (2*a*) through D (2*d*). When users make calls from portable telephones 1 and 101 as mobile stations to ordinary telephones, the calls are first connected to a mobile telephone exchange station through a base station that manages the radio-zone to which the portable telephones now belong, then from the mobile telephone exchange station to a general telephone network. The portable telephones 1, 101 are connected through radio channels to the base station responsible for the radio-zone so that they can make calls to other telephones.

FIG. 1 shows an example of this type of cellular system. Shown in FIG. 1 is a case where the portable telephones 1, 101 are located within a radio-zone managed by a base station C(2*c*) in the base stations A(2*a*) through D(2*d*). The portable telephones 1, 101 are connected to the base station 2*c* through radio channels so that the base station 2*c* will receive and process upward signals when the telephones make calls or perform location registration. Although the base stations 2*a* through 2*d* are responsible for different radio-zones, the outer edges of the base stations may overlap each other. The base stations 2*a* through 2*d* are connected to a mobile exchange station 3 through a multiplexing network, and plural mobile exchange stations are consolidated by a gate exchange station 5*a*. Plural gate exchange stations 4 provided in this system are connected to each other through a relay transmission line. General telephone exchange stations 5*a*, 5*b*, 5*c*, are located at each local area with a relay transmission line connecting them. Each of the general telephone exchange stations 5*a*, 5*b*, 5*c*, establishes connection with ordinary telephones. Then, in this case, a download center 6 is connected to the general telephone exchange station 5*b*.

At the download center 6, new pieces of music are collected at any time and a large number of music data are stored. According to the present invention, music data can be downloaded to the portable telephones 1, 101 from the download center 6 that is connected to the general telephone network. When the portable telephone 1 downloads music data, the user carrying the portable telephone 1 dials a telephone number of the download center 6, so that the portable telephone 1 is connected to the download center 6 in a path from the portable telephone 1 to the download center 6 through the base station 20, the mobile exchange station 3, the gate exchange station 4, the general telephone exchange station 5*a* and the general telephone exchange station 5*b*. Then, the user operates dial buttons and the like on the portable telephone 1 according to the menu indicated on its display to download music data associated to a desired music title. In this case, the music data is composed of musical score data and timbre data. Using the above-mentioned method, only the timbre data indicative of a variety of tones or the musical score data may be downloaded to the portable telephone 1 individually.

Figure 2:
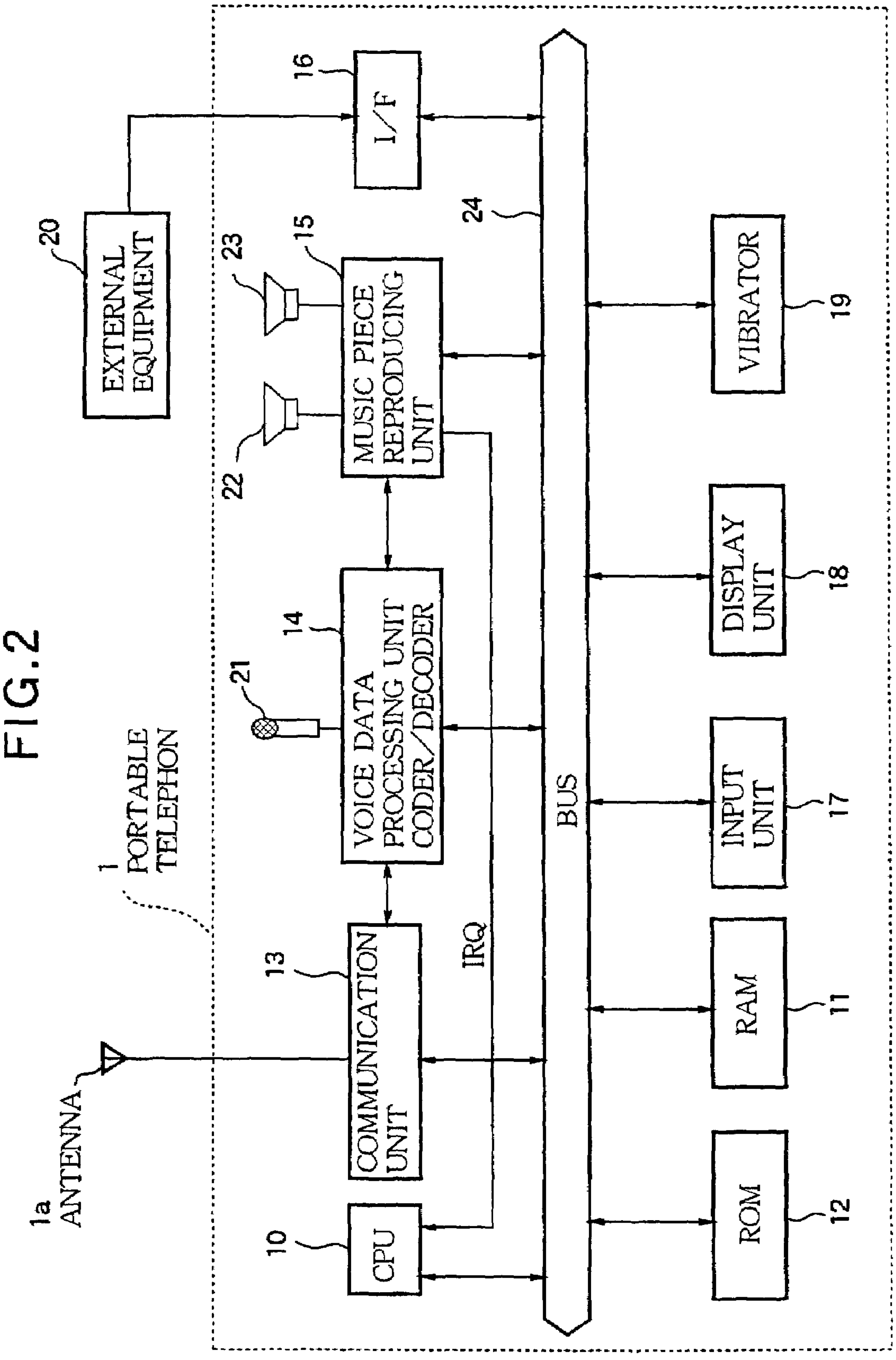
FIG. 2 is a diagram showing an embodiment of a music piece reproducing apparatus of the present invention that embodies a music piece reproducing method of the present invention when the music piece reproducing apparatus is applied to a portable telephone.

FIG. 2 illustrates an embodiment of a music piece reproducing apparatus of the present invention that embodies a music piece reproducing method of the present invention when the music piece reproducing apparatus is applied to a portable telephone as a telephone terminal device.

In FIG. 2, the portable telephone 1 includes an antenna 1*a* that is generally retractable. The antenna 1*a* is connected to a communication unit 13 having modulation and demodulation functions. A central processing unit (CPU) 10 of the system is a system control part that executes telephone function programs to control the operation of each part in the portable telephone 1. The system CPU 10 has a timer that measures an elapsed time in operation and generates a timer interrupt at certain intervals. Upon receipt of an interrupt request signal, the system CPU 10 executes auxiliary operations to support music piece reproduction processing to be described later. A system RAM 11 is a RAM (Random Access Memory) that provides a storage area for music data composed of musical score data and timbre data downloaded from the download center 6, a user setting data storage area, a work area for the system CPU 10, and so on. A system ROM 12 is a ROM (Read Only Memory) that stores several kinds of telephone function programs, such as to handle outgoing and incoming calls, executed by the system CPU 10, other programs for execution of auxiliary operations to the music piece reproduction processing, and several kinds of preset data such as musical score data and timbre data.

The communication unit 13 serves to demodulate a signal received at the antenna 1*a*, and to modulate and supply a sending signal to the antenna 1*a*. The received signal demodulated at the communication unit 13 is decoded at a voice data processing unit (coder/decoder) 14. A receiver signal inputted from a microphone 21 is compressed and encoded at the voice data processing unit 14. The voice data processing unit 14 carries out highly efficient compressive coding/decoding of transmitting voice; it may be coder/decoder of a CELP (Code Excited LPC) or ADPCM (Adaptive Differential PCM Coding) type. A music piece reproducing unit 15 generates sound of the receiver signal from the voice data processing unit 14 and issues the same from a receiver speaker 22, or reproduces and outputs music data as a calling or holding tone. The calling tone is issued from a speaker 23 for incoming calls. The holding tone is mixed with the receiver signal and issued from the receiver speaker 22.

Suppose that the music piece reproducing unit 15 is reproducing music data. If there occurs a certain amount of available space in an inner storage means for the musical score data, the music piece reproducing unit 15 gives the system CPU 10 an interrupt request signal (IRQ). Upon receipt of the interrupt request signal (IRQ), the system CPU 10 reads a next continued part of music score data from the system RAM 11 or the system ROM 12, and transfers the read data to the music piece reproducing unit 15. An interface (I/F) 16 is an interface through which music data composed of musical score data and timbre data are downloaded from external equipment 20 such as a personal computer. An input unit 17 is an input means with dial buttons from '0' to '9' and several other buttons provided on the portable telephone 1. A display unit 18 is a monitor display that shows a menu of telephone functions and other information changed according to button operations such as to operate dial buttons. A vibrator 19 is to inform the user of arrival of a call by silent vibration instead of calling sound. Each functional block sends and receives data and instructions through a bus 24.

Figure 3:
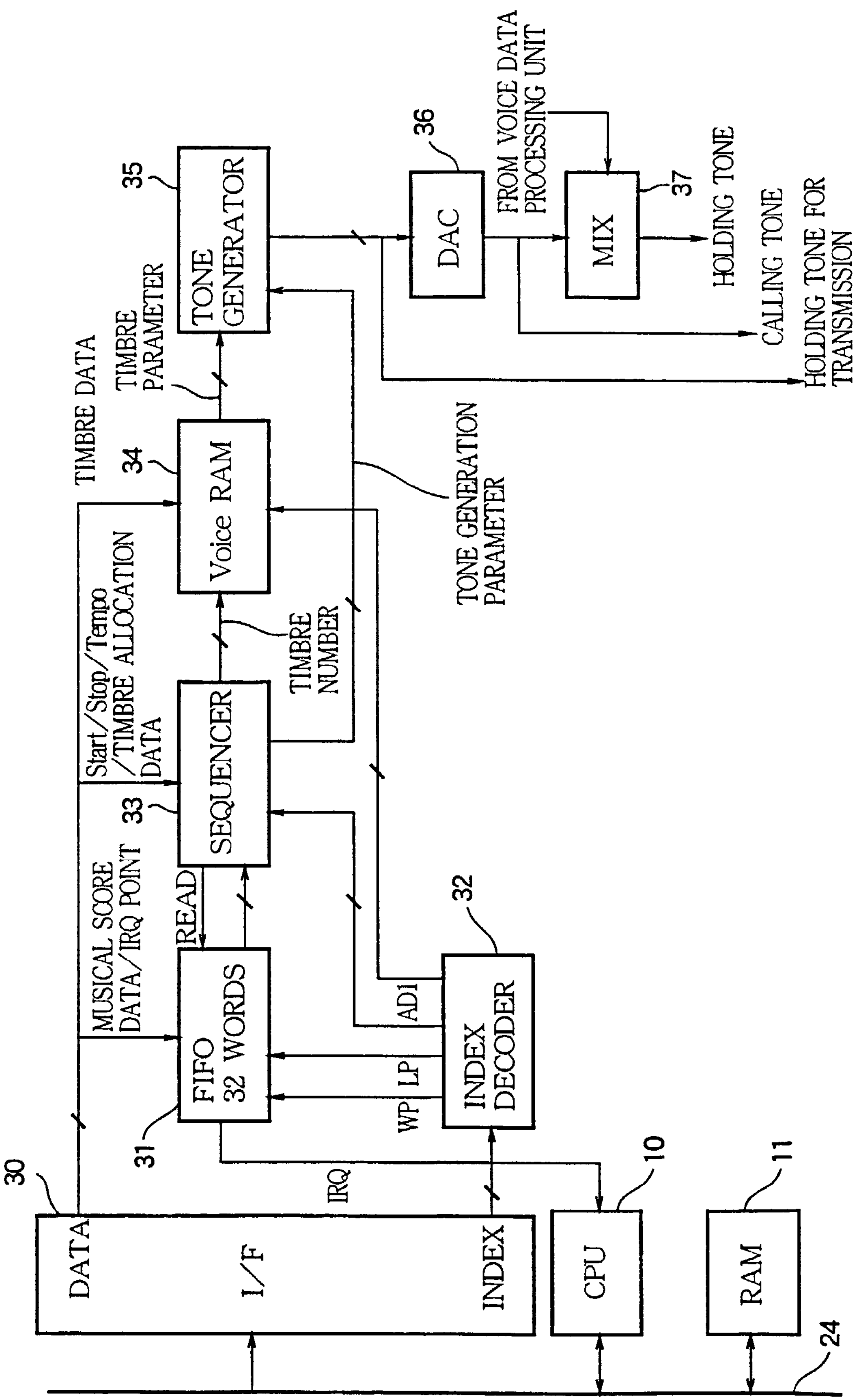
FIG. 3 is a diagram showing an exemplary configuration of a music piece reproducing unit as practiced in the music piece reproducing apparatus of the present invention that embodies the music piece reproducing method of the present invention.

FIG. 3 illustrates an exemplary configuration of the music piece reproducing unit 15 shown in FIG. 2.

In FIG. 3, an interface 30 is to receive several kinds of data through the bus 24. The interface 30 separates received data containing musical score data and timbre data from index data (INDEX) indicative of what data is received. The interface 30 outputs the data part from a data output and index data from an index output. An FIFO (First-In First-Out) buffer 31 is a storage means capable of storing a certain amount of musical score data, for example, up to 32 words. The musical score data is read out of the FIFO 31 sequentially from the earliest written part, and when there occurs a certain amount of available area in the FIFO 31, the FIFO 31 sends the system CPU 10 the interrupt request signal (IRQ).

An index decoder 32 decodes the index data, and supplies the FIFO 31 with a write pulse (WP) and a latch pulse (LP) for IRQ point data to be described later. The index decoder 32 also supplies a sequencer 33 with index data AD1 to inform the sequencer 33 that the data directed to the sequencer 33 has been outputted from the data output of the interface 30. Further, the index decoder 32 supplies a timbre data storage unit (Voice RAM) 34 with index data AD2 to inform the timbre data storage unit (Voice RAM) 34 that the timbre data directed to the timbre data storage unit (Voice RAM) 34 has been outputted from the data output of the interface 30. The sequencer 33 applies a read pulse to the FIFO 31 to read the musical score data sequentially from the FIFO 31 while setting a tone generation parameter s on a tone generator 35 along the musical score data in synchronism with time information of the musical score data. The sequencer 33 also supplies the timbre data storage unit (Voice RAM) 34 with a timbre number for each part specified by timbre allocation data fetched from the data output of the interface 30 so that timbre parameters corresponding to the timbre number are read out of the timbre data storage unit (Voice RAM) 34 and set for each part on the tone generator 35.

The timbre data storage unit (Voice RAM) 34 is a storage means that stores timbre data fetched from the data output of the interface 30; it has such a small storage capacity, for example, that it can store only timbre data of eight tone colors. The tone generator 35 can generate music signals, for example, for four parts at the same time. For each part, a timbre read out of the timbre data storage unit (Voice RAM) 34 is set according to the timbre allocation data so that each part will generate a music signal with the pitch and the duration of tone generation determined according to the timbre parameters supplied from the sequencer 33. The music signals generated for four parts are supplied to a digital/analog converter (DAC) 36 at predetermined reproduction timing to generate an analog music signal. The music signal is then decoded at the voice data processing unit 14 and mixed with a receiver signal by means of a mixer 37.

The following describes the operation of the music piece reproducing unit shown in FIG. 3. The user carrying the portable telephone 1 as shown in FIG. 2 selects a desired piece of music from information related to music such as music titles displayed on the display 18 in a music piece reproducing mode. Then, music data corresponding to the selected piece are read out of the system RAM 11 and sent to the music piece reproducing unit 15 through the bus 24. Of the timbre data of eight tone colors in the music data fetched through the interface 30, index data attached to the timbre data are decoded at the index decoder 32 and supplied and written as index data AD2 to the timbre data storage unit (Voice RAM) 34. The timbre data to be written to the timbre data storage unit (Voice RAM) 34 can be selected from many kinds of timbre data stored in the system RAM 11 before transfer.

FIG. 5 illustrates an example of a timbre data format for eight tone colors written in the timbre data storage unit (Voice RAM) 34. As shown in FIG. 5, timbre data from timbre 1 to timbre 8 are each composed of a waveform parameter, an envelope parameter, a modulation parameter and an effect parameter. Each parameter is peculiar to each of tone 1 to tone 8. The waveform parameter of each timbre data indicates a waveform of the music piece. For example, if the tone generator 35 is a PCM tone generator having a waveform table, the waveform parameter is to specify one of waveforms on the waveform table. If the tone generator 35 is an FM tone generator, the waveform parameter is to specify the algorithm that defines specific FM operations. The envelope parameter includes an attack rate, a decay rate, a sustain level and a release rate. The modulation parameter includes the depth or velocity of a vibrato or tremolo. The effect parameter includes a reverb, a chorus and a variation.

Figures 6, 7:
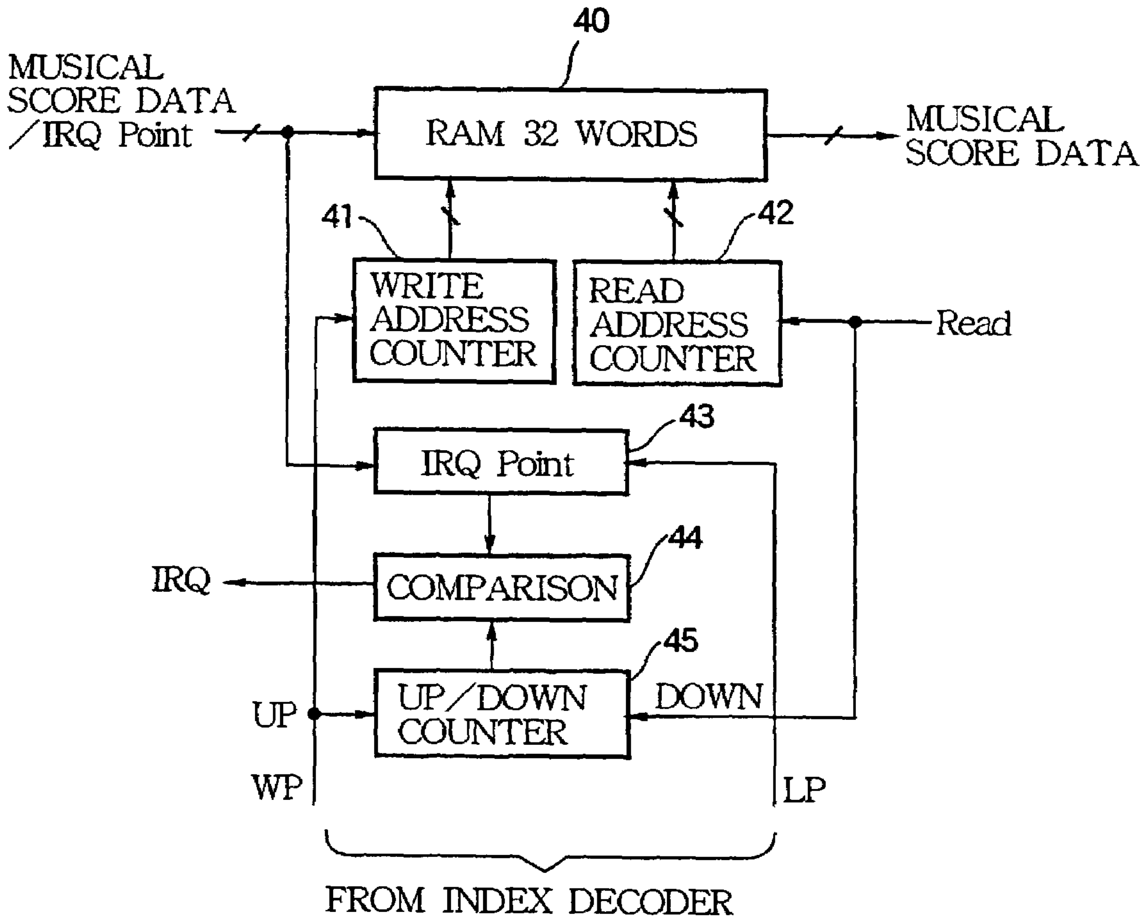
FIG. 6 is a diagram showing an example of a format of timbre allocation data used in the music piece reproducing apparatus according to the embodiment of the present invention.
FIG. 7 is a diagram showing the detailed arrangement of an FIFO in the music piece reproducing apparatus according to the embodiment of the present invention.

Tempo data (Tempo) and timbre allocation data in the music data fetched through the interface 30 are taken into the sequencer 33 by the index decoder 32 supplying the sequencer 33 with index data attached to the tempo data and the timbre allocation data as index data AD1. The sequencer 33 reads out of the timbre data storage unit (Voice RAM) 34 the timbre parameters specified by the timbre allocation data fetched, and sets the same on the tone generator 35. FIG. 6 illustrates an example of the timbre allocation data configuration. As shown in FIG. 6, tones allocated for part 1 to part 4 are indicated by timbre numbers. In other words, when the sequencer 33 supplies the timbre number specified for each part to the timbre data storage means 34, timbre parameters corresponding to the timbre number are read out of the timbre data storage means 34, and set on the tone generator 35 as a tone for each part.

It should be noted that the timbre data for music data to be reproduced are transferred to and written into the timbre data storage unit (Voice RAM) 34. Therefore, even if the timbre data storage unit (Voice RAM) 34 has such a small storage capacity that it can store only timbre data of eight tone colors in this embodiment, all the timbre data necessary for reproduction of the music data can be stored in the timbre data storage unit (Voice RAM) 34. In other words, even if the timbre data storage unit (Voice RAM) 34 has a small storage capacity, a piece of music with high sound quality can be reproduced based on the timbre data of high quality with an increased data amount. Further, since desired timbre data are selected from the system RAM 11 and written into the timbre data storage unit (Voice RAM) 34, a piece of music with a variety of tones can be reproduced. It should be noted that the timbre allocation data and the tempo data can be edited by the user.

32 words of musical score data in the music data fetched through the interface 30 are written into the FIFO 31 by the index decoder 32 decoding the index data attached to the musical score data and supplying a write pulse (WP) to the FIFO 31. The 32-word musical score data are thus written into the FIFO 31. The 32 words are part of musical score data of a piece of music; they are considered to be the top block of the musical score data. The musical score data written in the FIFO 31 are composed of note data and rest data. FIG. 4 illustrates an example of such a data format. FIG. 4 shows one word of note data that includes information on an octave code, a note code, a part number to which the note data belong, an interval indicative of a time length to the next note or rest, and the duration of tone generation. FIG. 4 also shows one word of rest data that includes rest data indicative of the kind of rest, a part number to which the rest data belong, and an interval indicative of a time length to the next note or rest.

When the tone generator 35 reproduces a piece of music, the note data and the rest data are read sequentially from the FIFO 31, and therefore, there occurs a certain amount of vacant area in the FIFO 31 as these data are read out one by one. The FIFO 31 has only the top 32-word musical score data, but the next part of the musical score data can be written into the vacant area. Therefore, even if the musical score data requires a large amount of data memory area for reproduction of music of high quality, parts or sections of the score data can be written sequentially into the FIFO 31 as soon as there occurs a certain amount of available space in the FIFO 31, thus reproducing musical score data of high quality. The music piece reproducing apparatus of the present invention carries out reproduction of music data on such a principle of setting next words when available area in the FIFO 31 occurs at the timing of writing the next part of the musical score data. The IRQ point data is set to give the system CPU 10 an interrupt request signal (IRQ) that instructs the system CPU 10 to write the subsequent part of musical score data into the FIFO 31. The IRQ point data is set prior to the start of reproduction. If the IRQ point data is set near 0 word, interrupt frequencies increase but the number of words to be written at a time is reduced, resulting in a decrease in load on the system CPU 10. If the IRQ point data is set near 32 words, interrupt frequencies are reduced but the number of words to be written at a time increases, resulting in an increase in load on the system CPU 10. Therefore, it is preferable to set the IRQ point data according to the processing speed of the system CPU 10.

Then, when the system CPU 10 instructs the music piece reproducing unit 15 to start reproduction of music data, the sequencer 33 applies a read pulse to the FIFO 31 to read the musical score data sequentially from the FIFO 31. If the current musical data are note data, the sequencer 33 sets on the tone generator 35 pitch data of an octave code and a note code in the musical score data, part specifying information, and data specifying 'key-on' at timing based on the set tempo and interval information. The tone generator 35 generates a musical sound with a pitch specified based on the timbre parameters set for the part specified from the data set in the tone generator register. Then, when time corresponding to the duration of tone generation for the note data has been elapsed, the sequencer 33 sets on the tone generator 35 key-off data with specifying the corresponding part of the music piece. Then, the tone generator 35 silences the musical sound. Such a sequence of operations are repeated each time the musical score data are read out of the FIFO 31, so that the music signals reproduced from the tone generator 35 are outputted to the DAC 36.

As the piece of music is reproducing, the interrupt request signal (IRQ) is given to the system CPU 10 each time an available area detected in the FIFO 31 becomes equal to the IRQ point data value. Upon receipt of the IRQ, the system CPU 10 reads the next musical score data for a predetermined number of words (31-IRQ point) from the system RAM 11, and sends the same to the bus 24. The musical score data are written into the available area in the FIFO 31 through the interface 30. Such write operation as to write the next musical score data for the predetermined number of words (31-IRQ point) into the FIFO 31 is repeatedly executed. Therefore, even if the musical score data contain many words of data, all the data words can be written in the FIFO 31 after all. The musical score data read out of the FIFO 31 are then reproduced and outputted from the tone generator 35 according to the tempo data. Thus, according to the present invention, a large amount of music data can be treated that allow the music piece to be reproduced with high quality even in a case where the FIFO 31 has such a small storage capacity, for example, only 32 words of music data.

Suppose that the music piece reproducing unit 15 is set to reproduce a piece of music when a call arrives at the portable telephone 1. When a call arrives at the portable telephone 1, the above-mentioned music piece reproduction processing is so executed that a music signal outputted from the DAC 36 will be issued from the speaker 23 as a calling tone. Suppose further that the music piece reproducing unit 15 is set to reproduce a piece of music as a holding tone when the user carrying the portable telephone 1 places a conversation on hold. When the portable telephone 1 is changed to a holding mode, the above-mentioned music piece reproduction processing is so executed that a music signal outputted from the DAC 36 will be issued from the speaker 22 as a holding tone. Simultaneously, the music signal outputted from the tone generator 35 are also supplied to the voice data processing unit 14 and sent through the communication unit 13 for the purpose of transmitting the holding tone.

Figure 8:
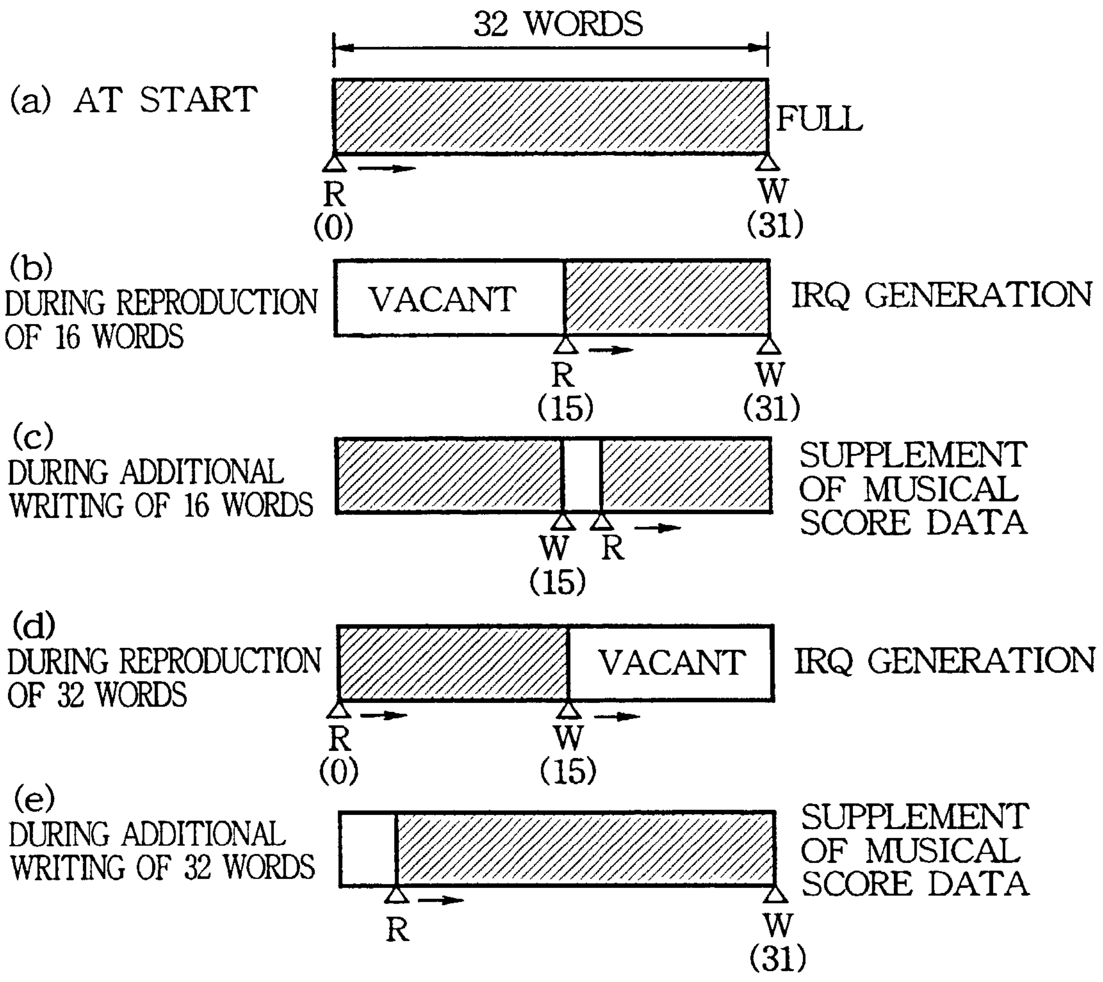
FIG. 8 is a diagram for explaining the operation of the FIFO in the music piece reproducing apparatus according to the embodiment of the present invention.

FIG. 7 illustrates the detailed arrangement of the FIFO 31. Referring also to FIG. 8, the following describes the operation of the FIFO 31. When the IRQ point data is outputted from the interface 30, a latch pulse (LP) is supplied from the index decoder 32 to a latch circuit 43, and as a result, the IRQ point data, for example, set to "15" in the latch circuit 43 is latched. Then, when the musical score data are outputted from the interface 30, the index decoder 32 applies a write pulse (WP) to a write address counter 41 and the up terminal of an up/down counter 45. The write pulse (WP) is generated each time one word of the musical score data is outputted. In its initial state, the write pulses make progress in the write address counter 41 sequentially from "0" to "31," so that the top 32 words of musical score data are stored in a RAM 40 that has a storage capacity of at least 32 words. Simultaneously, the up/down counter 45 counts up from "0" to "31." FIG. 8(*a*) shows this state as the start of the first execution. Finally, the RAM 40 reaches the "FULL" state in which the write address W comes to the address "31" and the read address R remains in the address "0."

Under this circumstance, when the start of reproduction of the music data is instructed, the sequencer 33 starts making progress while applying a read pulse (Read) to the read address counter 42 so as to start reading the musical score data sequentially from the top one located at the address "0" on the RAM 40. The read pulse (Read) is also applied to the down terminal of the up/down counter 45. Thus, the up/down counter 45 counts up each time the write pulse (WP) is applied, and counts down each time the read pulse (Read) is applied.

FIG. 8(*b*) shows a state of the RAM in which 16 words of the musical score data have been read out and reproduced. Since 16 words of the musical score data have been read out, it is apparent that the read address counter 42 is at the address "15" and the counter value of the up/down counter 45 is (31−16)=15. As mentioned above, the IRQ point data latched in the latch circuit 43 is "15," and as a result, a comparison circuit 44 detects that the counter value of the up/down counter 45 and the IRQ point data value of the latch circuit 43 match with each other. Then, the comparison circuit 44 outputs an interrupt request signal (IRQ) to the system CPU 10. Upon receipt of the IRQ, the system CPU 10 reads the next 16 words (31-IRQ point) of the musical score data from the system RAM 11, and sends the same to the bus 24.

The musical score data sent to the bus 24 are written from the addresses "0" to "15" that are now available on the RAM 40. In this case, the index decoder 32 applies the write pulse (WP) to the write address counter 41 and the up terminal of the up/down counter 45. 16 write pulses (WP) are generated for 16 words, and because of these pulses, the write address counter 41 that is set to count up to a modulus of 31 makes progress and reaches the address "15" while writing the musical score data to each corresponding address. Simultaneously, the up/down counter 45 is incremented by "16." However, since the up/down counter 45 counts down even in this case due to the read pulses (Read), the count value becomes the balance of the write pulses (WP) and the read pulses (Read). FIG. 8(*c*) shows a state of the RAM in which 16 words of the musical score data have been replenished as seen at the time of additional writing of 16 words.

Next, the sequencer 33 applies the read pulses (Read) to the read address counter 42, and as a result, 32 words of the musical score data are read out of the RAM 40. Such a state of the RAM 40 is shown in FIG. 8(*d*). Since the read address counter also counts up to the modulus of 31, the read address counter 42 is returned to the address "0" here. At this time, since the counter value of the up/down counter 45 is at the address "15" again, the comparison circuit 44 outputs the interrupt request signal (IRQ) again to the system CPU 10. Then, the above-mentioned operations are so repeated that the subsequent 16 words of the musical score data are written into the addresses "16" to "31" on the RAM 40. Thus, the next 16 words of the musical score data are replenished until the next 32 words of the musical score data are additionally written in total. Such a state of the RAM 40 is shown in FIG. 8(*e*).

As discussed above, 16 words of musical score data are additionally written and replenished to the RAM 40 sequentially each time there occurs 16 words of available area on the RAM 40. Therefore, even if the RAM 40 has a small storage capacity of at least 32 words, any music data having a large amount of musical score data that allow the music data to be reproduced with high quality can be written sequentially onto the RAM 40 while reproducing the same. It should be noted that the counter value of the up/down counter 45 always matches the number of words of the musical score data that remain stored without being read out of the RAM 40.

When reproduced, each part has a timbre allocated according to the timbre allocation data, or the timbre allocation data for each part may be inserted in the musical score data beforehand. During reproduction, the timbre allocation data are read out of the FIFO 31, so the sequencer 33 supplies the timbre data storage unit (Voice RAM) 34 with a timbre number specified by the timbre allocation data. In this case, the timbre data of eight tone colors that are more than the number of parts, so any timbre can be selected for each part out of eight tone colors of the timbre data. Timbre parameters corresponding to the timbre number are read out of the timbre data storage unit (Voice RAM) 34, and set in a tone generator register of the tone generator 35 for the part specified by the timbre allocation data. The timbre of the part concerned to be reproduced on the tone generator 35 is thus changed during the reproduction.

As discussed above, since the timbre allocation data for each part is inserted in the musical score data, the timbre of each part can be voluntarily changed during the reproduction. Further, the timbre data of eight tone colors stored in the timbre data storage unit (Voice RAM) 34 may be selected by the user out of all the timbre data stored in the system RAM 11, so that the selected timbre data can be transferred to the timbre data storage unit (Voice PAM) 34. Since the system RAM 11 has many kinds of timbre data downloaded from the download center 6 or the external equipment 20, any timbre data from among the timbre data of many kinds can be selectively stored into the timbre data storage unit (Voice RAM) 34.

Figure 9:
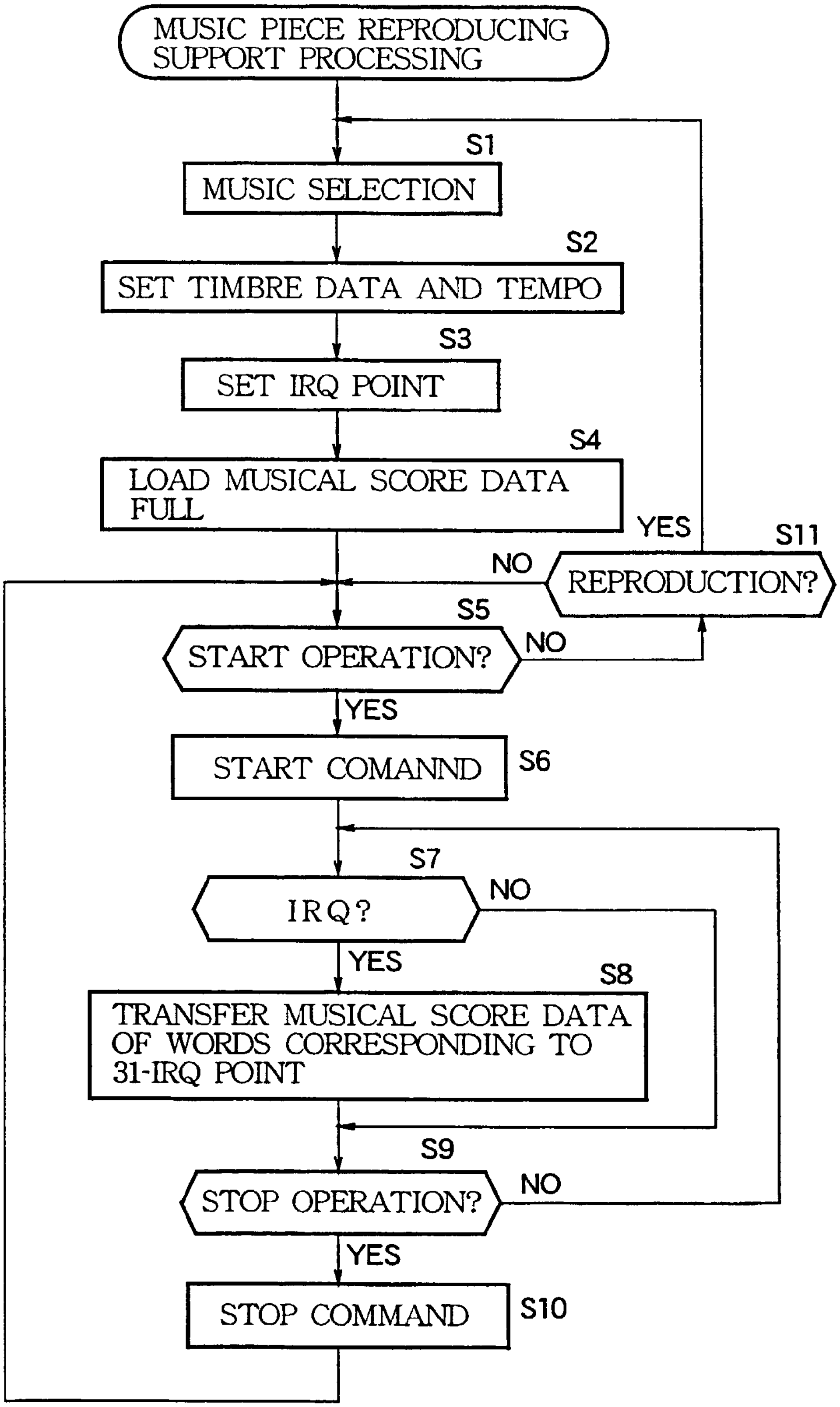
FIG. 9 is a flowchart showing music piece reproduction support processing executed by a system CPU in a portable telephone to which the music piece reproducing apparatus of the present invention is applied.

FIG. 9 is a flowchart illustrating music piece reproduction support processing executed by the system CPU 10 during the reproduction of a piece of music. When the portable telephone 1 is changed to the music piece reproducing mode, a music piece reproducing menu appears on the display 18. In step S1, the user selects a desired piece of music from the music selection menu by operating the dial buttons and the like. In this case, the selection is made from music data stored in the system RAM 11 and the system ROM 12. The system RAM 11 stores music data downloaded from the download center 6 and the external equipment 20. After the completion of the selection, timbre data and tempo data are set in step S2. In step S2, timbre data of eight tone colors for respective parts of the selected music data are transferred to the music piece reproducing 15 and stored in the timbre data storage unit (Voice RAM) 34. The tempo data for respective parts of the selected music data are also transferred to the music piece reproducing unit 15 and set in the sequencer 33. The tempo data may be edited on the display 18 by operating the dial buttons and the like.

In step S3, the IRQ point data is set on the display 18 to a predetermined value by operating the dial buttons and the like. The IRQ data is set by taking into account the processing speed of the system CPU 10. Then, 32 words of musical score data in the selected music data are read out of the system RAM 11, transferred to the music piece reproducing unit 15, and written into the FIFO 31 until the FIFO 31 becomes the "FULL" state.

In the next step S5, the system waits until start operation is instructed. The start operation is activated at the time of arrival of a call if the music data is to be reproduced as a calling tone, or by operating the holding button if it is to be reproduced as a holding tone. If it is determined in step S5 that the start operation is instructed, the operating procedure goes to step S6 in which a start command is forwarded to the music piece reproducing unit 15.

If not determined that the start operation is instructed, it branches to step S11 in which it is determined whether a button to instruct the start of reproduction is operated. If it is determined that the button is operated, the operating procedure returns to step S1 so that the operations from step S1 to step S4 are repeated. If not determined that the button is operated, it returns to step S5 and waits until the start operation is instructed.

Upon receipt of the start command, the music piece reproducing unit 15 starts the above-mentioned music piece reproduction processing to reproduce the selected music piece. Then, when it is determined in step S7 that an interrupt request signal (IRQ) is generated to the music piece reproducing unit 15, the operating procedure goes to step S8 in which the musical score data for the next (31-IRQ point) words are read out of the system RAM 11 and transferred to the music piece reproducing unit 15. The operations of steps S7 and S8 are repeated until it is determined in step S9 that stop operation is instructed. The stop operation is activated by operating a talk button if the music data has been reproduced as the calling tone, or by operating a holding tone releasing button if it has been reproduced as the holding tone. If it is determined in step S9 that the stop operation is instructed, the operating procedure goes to step S10 in which a stop command is forwarded to the music piece reproducing unit 15 to instruct the music piece reproducing unit 15 to stop the music piece reproduction processing. Then, the operating procedure returns to step S5 and waits until the start operation is instructed again.

As discussed above, the music piece reproduction processing to reproduce the selected music piece is executed at the time of arrival of a call if the selected music piece is to be reproduced as a calling tone, or by operating the holding button if it is to be reproduced as the holding tone. In either case, the music piece to be reproduced is the one that has been selected in the step of music selection. The music selection may be made to select different music pieces for the calling tone and the holding tone so that both music pieces can be reproduced independently when the start of either the calling tone or the holding tone is instructed.

Further, since the music selection can be made at any time, any music piece can be selected for both the calling tone and the holding tone.

It should be noted that the system CPU 10 executes the main processing for telephony functions, not shown. However, the music piece reproduction support processing only requires such a light load that the system CPU 10 can execute the music piece reproduction support processing together with its main processing without the need of replacing the system CPU 10 by high-speed one.

Although in this embodiment the FIFO has such a storage capacity that it can store 32 words of musical score data, the present invention is not limited to this capacity. The storage capacity of the FIFO 31 can vary as long as it is much smaller than that of the system RAM 11. Further, the timbre data storage unit (Voice RAM) 34 has such a storage capacity that it can store timbre data of eight tone colors, but it is not limited to the capacity as well. The capacity of the timbre data storage unit (Voice RAM) 34 can be extremely reduced, compared to that of the system RAM 11, as long as the number of tone colors is equal to or more than the number of parts of the music piece corresponding to channels of tone generation.

Figure 10:
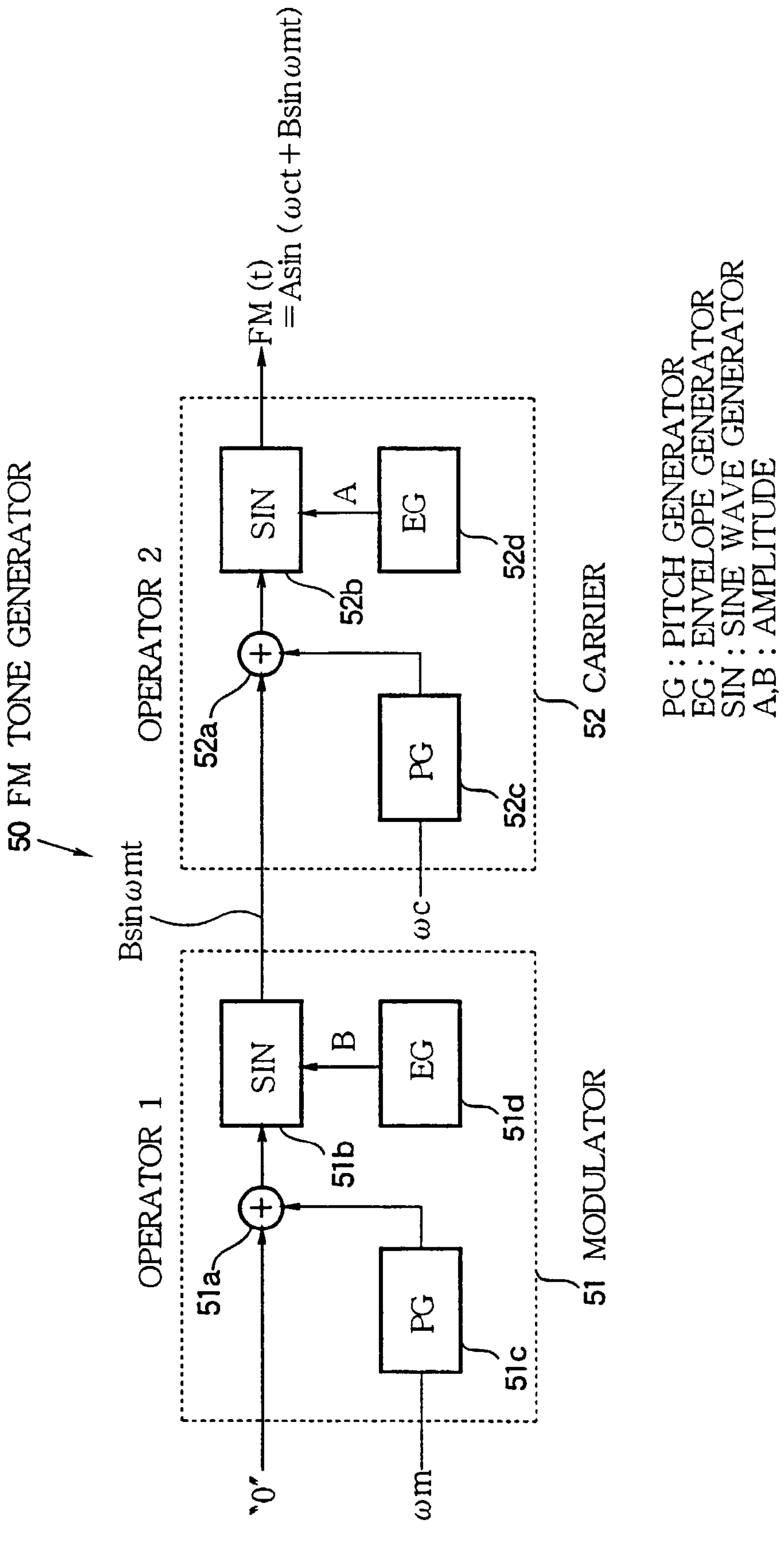
FIG. 10 is a diagram showing a configuration of a frequency modulation type of tone generator as an example of the tone generator in the music piece reproducing apparatus according to the embodiment of the present invention.

As mentioned above, the tone generator 35 in the music piece reproducing unit 15 can be a frequency modulation type of tone generator, i.e., an FM tone generator. The FM tone generator is designed to use out-of-phase harmonics produced by frequency modulation to synthesize musical sounds; it can generate waveforms having out-of-phase harmonic components like inharmonic tones in a relatively simple circuit configuration. The FM tone generator has the advantage of generating a wide range of musical sounds from a synthesized tone to an electronic tone. FIG. 10 illustrates an example of such a configuration.

The FM tone generator uses oscillators called operators that oscillate equivalently to generate a sine wave. As shown in FIG. 10, the FM tone generator 50 is made of the operator 1 and the operator 2 connected in series. A sine wave oscillated from the operator 1 is supplied to the operator 2 as a modulation signal so that the operator 2 generates a frequency modulated wave FM(t). On one hand, the operator 1 is called a modulator 51 because it generates a modulation signal; on the other hand, the operator 2 is called a carrier 52 because it generates a carrier wave. The operators 1 and 2 are configured in the same manner.

In the modulator 51, a pitch generator 51*c* outputs pitch data variable in the form of a sawtooth according to the input of phase angle data $\omega_m$. Then, the pitch data and modulation data "0" inputted to the modulator 51 are added at an adder 51*a*. The output of the adder 51*a* is supplied to a sine wave generator 51*b* in which a sine wave table is read according to the pitch data outputted from the adder 51*a* as the data that varies in the form of a sawtooth. Then, the sine wave generator 51*b* generates a sine wave at frequencies corresponding to varied velocities of the pitch data. The amplitude of the sine wave is controlled by amplitude data B generated from an envelope generator 51*d*. For this reason, the sine wave outputted from the sine wave generator 51*b* is represented by $B \cdot \sin \omega_m t$.

In the carrier 52, a pitch generator 52*c* outputs pitch data variable in the form of a sawtooth according to the input of phase angle data $\omega_c$. Then, the pitch data and the sine wave of modulation signal outputted from the modulator 51 are added at an adder 52*a*. The output of the adder 52*a* is supplied to a sine wave generator 52*b* in which a sine wave table is read according to the added data outputted from the adder 52*a*. Then, the sine wave generator 52*b* generates a sine wave varied according to the rate of change in the added data. The amplitude of the sine wave is controlled by amplitude data A generated from an envelope generator 52*d*. For this reason, the sine wave outputted from the sine wave generator 52*b* is represented by $A \cdot \sin (\omega_c)_t + B \sin \omega_m t)$. Thus, the output FM(t) from the carrier 52 is subjected to frequency modulation, and the above equations are basic formulas for the FM tone generator 50.

As shown in FIG. 10, since the modulator 51 and the carrier 52 have the same circuit configuration, the frequency modulated wave can be generated in such a configuration that either of them feeds back its output as its input. This type of FM tone generator is called a feedback FM tone generator, and an example of such a configuration is shown in FIG. 11.

Figures 11, 12:
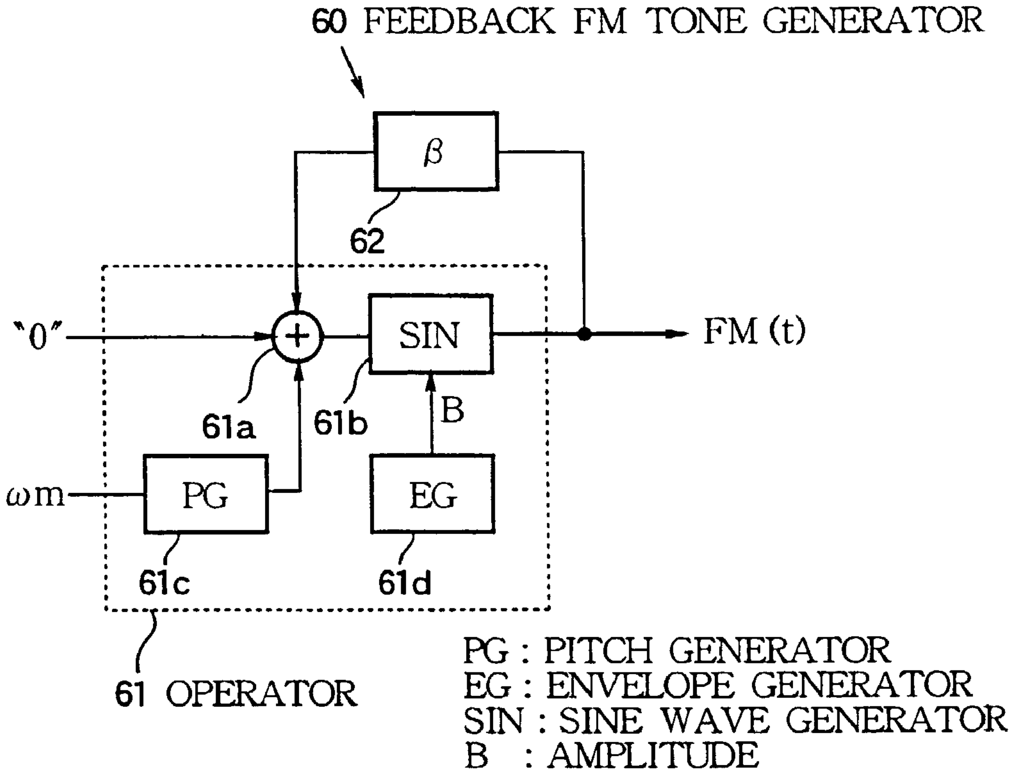
FIG. 11 is a diagram showing a configuration of another frequency modulation type of tone generator as an example of the tone generator in the music piece reproducing apparatus according to the embodiment of the present invention.
FIG. 12 is a diagram showing an example of a timbre data format for eight tone colors written in the timbre data storage unit (Voice RAM) by using a frequency modulation type of tone generator as the tone generator in the music piece reproducing apparatus according to the embodiment of the present invention.

As shown in FIG. 11, the feedback FM tone generator 60 is constituted of an operator 61 and a feedback circuit 62. In the operator 61, a pitch generator 61*c* outputs pitch data variable in the form of a sawtooth according to the input of phase angle data $\omega_m$. Then, the pitch data and modulation data "0" inputted to the operator 61 are added at an adder 61*a*. The output of the adder 61*a* is supplied to a sine wave generator 61*b* in which a sine wave table is read according to the added data outputted from the adder 61*a*. Then, the sine wave generator 61*b* generates a sine wave varied according to the rate of change in the added data. The amplitude of the sine wave is controlled by amplitude data B generated from an envelope generator 61*d*. The output of the sine wave generator 61*b* is so controlled that a feedback rate $\beta$ can be obtained in a feedback circuit 62. Then, it is inputted to the adder 61*a* as a modulation signal. The sine wave generator 61*b* thus outputs an output FM(t) that is subjected to frequency modulation.

The feedback FM tone generator 60 is suitable for generation of a string type of music sound. The FM tone generators 50 and 60 can generate musical sounds of different tones by changing the way or method to connect the circuits on an operator basis. The method of connecting operators is called the algorithm.

In the above-described FM tone generators, the tone can vary by controlling the pitch data varied in the form of a sawtooth and outputted from the pitch generator, by controlling the amplitude outputted from the envelope generator, or by changing the algorithm. Timbre data for obtaining desired tone colors on the FM tone generators consist of timbre data for the modulator and timbre data for the carrier. The amount of data for one tone color can be extremely reduced compared to that of the waveform memory type of tone generator.

Figure 13:
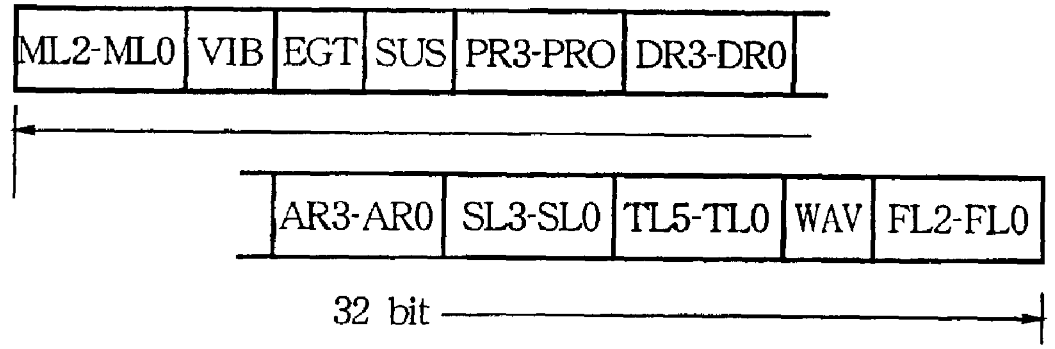
FIG. 13 is a diagram showing a detailed format of the timbre data shown in FIG. 12.

FIG. 12 illustrates an example of a timbre data format for eight tone colors written in the timbre data storage unit (Voice RAM) 34 when the tone generator 35 assumes the form of an FM tone generator. Timbre data of eight tone colors, such as timbre 1, timbre 2, . . . written in the timbre data storage unit (Voice RAM) 34 each contain timbre data for the modulator and timbre data for the carrier. Both timbre data for the modulator and the carrier assume the same data format. An example of such a data format is shown in FIG. 13. As shown in FIG. 13, each timbre data for the modulator or the carrier may be 32 bits of data containing the following: three bits of multiple setting data (ML2–ML0), a bit of vibrato ON/OFF data (VIB), a bit of envelope waveform type data (EGT), a bit of sustain ON/OFF data (SUS), four bits of attack rate setting data (AR3–AR0), four bits of decay rate setting data (DR3–DR0), four bits of sustain level setting data (SL3–SL0), four bits of release rate setting data (RR3–RR0), a bit of waveform selecting data (WAV), three bits of feedback amount setting data (FL2–FL0), and six bits of total level data (TL5–TL0).

The multiple setting data (ML2–ML0) are adopted to set an oscillator frequency magnification. The pitch generator generates pitch data with a rate of change multiplied by the magnification specified by the multiple setting data. The magnification set by the multiple setting data may range from ±0.5 to ±7, and if the multiple setting data is used in the modulator 51, the frequency of the modulation signal is changed to vary the timbre. The vibrato ON/OFF data (VIB) are set to determine whether a vibrato is applied or not. The envelope waveform type data (EGT) are set to determine whether the envelope waveform is of an envelope of sustained sound or an envelope of decayed sound. The sustain ON/OFF data (SUS) are data by which the release rate is changed to another release rate tilted at a predetermined gentle angle at timing of terminating the length of tone generation if the sustain ON/OFF data is set ON, or the release rate becomes a set value at timing of terminating the length of tone generation if the sustain ON/OFF data is set OFF.

The attack rate setting data (AR3–AR0) are used to set the time from when tone generation commences until it reaches the maximum volume. The time set by the attack rate setting data may range from 0.0 ms to 38.1 sec. The decay rate setting data (DR3–DR0) are used to set the decay time from when the sound reaches the maximum volume until it falls into the sustain level. The decay time set by the decay rate setting data may range from 4.47 ms to 73.2 sec. The sustain level setting data (SL3–SL0) are used to set a sustain level when the envelope waveform is determined by the envelope waveform type data (EGT) to be sustain sound.

In the case of decayed sound, the release rate setting data (RR3–RR0) sets the decay time from the sustain level to the timing at which the length of the tone generation is terminated, and after the timing of terminating the duration of the tone generation, it is decayed at a predetermined sharp angle of tilt. In the case of sustained sound, the release rate setting data sets the decay rate from the timing of terminating the tone generation. The decay rate set by the release rate setting data may range from 4.47 ms to 73.2 sec.

The waveform selection data (WAV) are set to determine whether the waveform generated by the sine wave generator is a sine wave or a half-wave rectified sine wave. The feedback amount setting data (FL2–FL0) are used to set a feedback factor for the feedback FM tone generator shown in FIG. 11; they are effective for the carrier operator alone. Therefore, it is desirable to set the data in the carrier so as to generate a string type of tone. The feedback amount setting data may be represented as time ranging from 0 to 4π. The total level data (TL5–TL0) are designed to set the total volume.

If the tone generator 35 is thus configured as an FM tone generator, for example, timbre data of one tone color can be represented as a pair of 32-bit (32×2 bits) data consisting of 32-bit timbre data for the modulator and 32-bit timbre data for carrier. Since the amount of timbre data for eight tone colors to be stored in the timbre data storage unit (Voice RAM) 34 can be reduced to 8×(32×2) bits, i.e., 64 bytes, the use of the FM tone generator as the tone generator 35 has the advantage of reducing the storage capacity of the timbre data storage unit (Voice RAM) 34. Further, even if the transfer rate of timbre data to the timbre data storage unit (Voice RAM) 34 is low, since the amount of timbre data for eight tone colors is reduced, the timbre data can be transferred in a very short time. Therefore, even if the processing speed of the CPU 10 is slow, a music piece of several tones can be reproduced with high quality. Furthermore, timbre data can be downloaded from the download center 6 in a short time because of a small amount of timbre data per tone color. The amount of timbre data per tone color may be a few k-bytes for the waveform memory type of tone generator (PCM tone generator). Therefore, it is apparent that the use of an FM tone generator allows the amount of timbre data per tone color to be greatly reduced compared to that for the waveform memory type of tone generator.

Although the use of an FM tone generator is described here, the present invention is not limited thereto, and other types of tone generator, such as tone generators of the waveform memory type (PCM tone generator) and of physical model type, can be used as the tone generator 35 in the music piece reproducing apparatus of the present invention.

Further, the tone generator may also be composed of either hardware using a DSP or the like or software implementing a tone generator program. Furthermore, the musical score data are formatted as shown in FIG. 4, but the present invention is not limited to this format. For example, the musical score data may be transferred as a MIDI file with time information or an SMF (standard MIDI file).

As described above, according to one aspect of the present invention, timbre data transferred through the interface means are stored into the timbre data storage means, the storage capacity of which is available only for necessary kinds of timbre data, so that the data amount for parameters in the timbre data can be large enough to obtain tones of high quality even if the timbre data storage means has a small storage capacity, thereby reproducing a piece of music with tones of high quality.

Further, among the many kinds of timbre data stored in the storage means provided outside the music piece reproducing means, only the timbre data necessary to reproduce a piece of music are transferred to the music piece reproducing means and stored in the timbre data storage means, so that several kinds of timbre data can be selected with which the piece of music is reproduced even though the storage capacity of the timbre data storage means is small. In addition, if the timbre data are downloaded to an external storage means through a communication line, a choice of timbre data can be widened.

All the data processing means has to do is to read desired timbre data and to send the same to the music piece reproducing means; it is not required to carry out reproduction of a piece of music. This allows music of high quality to be reproduced even with a low-speed processing unit.

In addition, if the tone generator of the music piece reproducing means provided in a telephone terminal device is adopting a frequency modulating method, the amount of timbre data required for the frequency modulation type of tone generator can be extremely reduced as compared to that of a waveform memory type of tone generator (PCM tone generator). Therefore, even if the timbre data is transmitted through a low-speed transmission path, for example, due to low speed of data processing by the data processing unit, the telephone terminal device can reproduce a piece of music with a variety of tones of high quality. Further, since the amount of timbre data is reduced, timbre data enough to reproduce a piece of music with tones of high quality can be stored even in a timbre data storage means, the storage capacity of which is small. Furthermore, timbre data can be downloaded from the download center in a short time because of a small amount of timbre data per tone color.

According to another aspect of the present invention, when a vacant area is created in the musical score storing memory, a next portion of the musical score data is subsequently loaded into the memory. By such a construction, a music piece of a high quality requiring a great data volume can be reproduced even though the music score storing memory has a small capacity. A music piece having a long play time can be reproduced without interruption.

Further, the CPU is not required to execute the music reproduction process, but simply executes a data transfer process of feeding a next portion of the music score data when a vacant area is yielded in the memory buffering the music score data. Therefore, the CPU of moderate speed may be sufficient to reproduce the high quality of the melody tones.

The invention claimed is:

1. A telephony terminal apparatus comprising:

- a communication unit that transmits a signal to a remote location and receives a signal from the remote location;
- a memory unit that stores data including score data which represents a music piece; and
- a music reproduction unit that can reproduce a music piece in association with the signal, wherein the music reproduction unit includes:

- a score data memory that has a limited space for storing a part of score data, which represents a music piece and which can be provided from the memory unit;
- an interface that can be operated to load the score data from the memory unit into the score data memory;
- a tone generator of a frequency modulation type settable with parameters for generating harmonics by frequency modulation to synthesize a tone;
- a performance controller that sequentially retrieves the score data from the score data memory so as to set the tone generator with the parameters according to the retrieved score data; and
- a memory monitor that detects when a vacant area is created in the limited space of the score data memory upon sequential retrieval of the score data for operating the interface to load another part of the score data into the vacant area, thereby enabling the tone generator to continue the synthesizing of the tones of the music piece.

2. The telephony terminal apparatus according to claim 1, wherein the music reproduction unit further includes a timbre data memory that has a limited capacity for storing timbre data corresponding to a predetermined number of timbres, so that the tone generator uses the timbre data stored in the timbre data memory for generating harmonics by frequency modulation to synthesize the tones of the music piece.

3. The telephony terminal apparatus according to claim 2, wherein the interface can transfer data including the timbre data between the music reproduction unit and the memory unit, the interface being operated for transferring the timbre data to the music reproduction unit so as to load the timbre data into the timbre data memory.

4. The telephony terminal apparatus according to claim 3, further including a central processing unit that treats various data, wherein the interface is operated under control by the central processing unit for transferring the timbre data from the memory unit to the timbre data memory of the music reproduction unit and for transferring the score data from the memory unit to the score data memory of the music reproduction unit.

5. The telephony terminal apparatus according to claim 4, wherein the communication unit can receive a signal representing either of the score data and the timbre data so as to download the same into the memory unit.

6. A music reproducing apparatus for use in a telephony terminal apparatus having a telephony function of transmitting a signal to a remote location and receiving a signal from the remote location, the music reproducing apparatus being used to reproduce a music piece in association with the telephony function, and comprising:

- a score data memory that has a limited space for storing a part of score data, which represents a music piece and which can be provided from a data source of the telephony terminal apparatus;
- an interface that can be operated to load the score data from the data source into the score data memory;
- a tone generator that is set with a variable parameter derived from the score data for sequentially generating tones of the music piece;
- a performance controller that sequentially retrieves the score data from the score data memory so as to set the tone generator with the variable parameter according to the retrieved score data; and
- a memory monitor that detects when a vacant area is created in the limited space of the score data memory upon sequential retrieval of the score data for operating the interface to load another part of the score data into the vacant area, thereby enabling the tone generator to continue the generating of the tones of the music piece.

7. The music reproducing apparatus according to claim 6, further including a timbre data memory that stores timbre data corresponding to a number of timbres, wherein the performance controller reads out timbre data corresponding to a designated timbre by the score data from the timbre data memory, and sets the tone generator with the read timbre data, thereby enabling the tone generator to generate the tones of the music piece having the designated timbre.

8. A telephony terminal apparatus comprising:

- a processor that processes data to execute a task with a telephony function of transmitting a signal to a remote location and receiving a signal from the remote location;
- a memory device that stores data including score data representative of a music piece;
- a music reproduction device that operates according to the score data under control by the processor to reproduce a music piece in association with the task, wherein the music reproduction device includes:
- a score data memory that has a limited space for storing a part of the score data, which represents a music piece and which can be provided from the memory device;
- an interface that can be operated to load the score data from the memory device into the score data memory;
- a tone generator that is set with a variable parameter derived from the score data for sequentially generating tones of the music piece;
- a performance controller that sequentially retrieves the score data from the score data memory so as to set the tone generator with the variable parameter according to the retrieved score data; and
- a memory monitor that notifies the processor when a vacant area is created in the limited space of the score data memory upon sequential retrieval of the score data, so that the processor operates the interface to load another part of the score data from the memory device into the vacant area of the limited space of the score data memory, thereby enabling the tone generator to continue the generating of the tones of the music piece.

9. The telephony terminal apparatus according to claim 8, further including a timbre data memory that stores timbre data corresponding to a number of timbres, wherein the performance controller reads out timbre data corresponding to a designated timbre by the score data from the timbre data memory, and sets the tone generator with the read timbre data, thereby enabling the tone generator to generate the tones of the music piece having the designated timbre.

10. The telephony terminal apparatus according to claim 8, further including a communication device that can communicate with an external database to download therefrom the score data into the memory device.

11. A method of reproducing a music piece by a telephony terminal apparatus having a communication unit that transmits a signal to a remote location and receives a signal from the remote location, a memory unit that stores data including score data which represents a music piece, and a music reproduction unit that can reproduce a music piece in association with the signal, the method comprising the steps of:

- providing the music reproduction unit with a score data memory that has a limited space for storing a part of score data, which represents a music piece and which can be provided from the memory unit;
- providing the music reproduction unit with an interface that can be operated to load the score data from the memory unit into the score data memory;
- providing the music reproduction unit with a tone generator of a frequency modulation type settable with parameters for generating harmonics by frequency modulation to synthesize a tone;
- sequentially retrieving the score data from the score data memory for setting the tone generator with the parameters according to the retrieved score data; and
- detecting when a vacant area is created in the limited space of the score data memory upon sequential retrieval of the score data for operating the interface to load another part of the score data into the vacant area, thereby enabling the tone generator to continue the synthesizing of the tones of the music piece.

12. A method of reproducing a music piece in a telephony terminal apparatus having a telephony function of transmitting a signal to a remote location and receiving a signal from the remote location, comprising the steps of:

- providing a score data memory that has a limited space capable of storing a part of score data, which represents a music piece and which can be provided from a data source of the telephony terminal apparatus;
- operating an interface to load the score data from the data source into the score data memory;
- setting a tone generator with a variable parameter derived from the score data for sequentially generating tones of the music piece in association with the telephony function;
- sequentially retrieving the score data from the score data memory so as to set the tone generator with the variable parameter according to the retrieved score data; and
- detecting when a vacant area is created in the limited space of the score data memory upon sequential retrieval of the score data for operating the interface to load another part of the score data into the vacant area, thereby enabling the tone generator to continue the generating of the tones of the music piece.

13. A method of reproducing a music piece from a telephony terminal apparatus having a processor that processes data to execute a task with a telephony function of transmitting a signal to a remote location and receiving a signal from the remote location, a memory device that stores data including score data representative of music piece and a music reproduction device that operates according to the score data under control by the processor to reproduce a music piece in association with the task, the method comprising the steps of:

- providing the music reproduction device with a score data memory that has a limited space capable of storing a part of the score data, which represents a music piece and which can be provided from a memory device;
- operating an interface to load the score data from the memory device into the score data memory;
- setting a tone generator of the music reproduction device with a variable parameter derived from the score data for sequentially generating tones of the music piece;
- sequentially retrieving the score data from the score data memory so as to set the tone generator with the variable parameter according to the retrieved score data; and
- notifying the processor when a vacant area is created in the limited space of the score data memory upon sequential retrieval of the score data, so that the processor operates the interface to load another part of the score data from the memory device into the vacant area of the limited space of the score data memory, thereby enabling the tone generator to continue the generating of the tones of the music piece.

14. A machine readable medium for use in a telephony terminal apparatus having a central processing unit, a communication unit that transmits a signal to a remote location and receives a signal from the remote location, a memory unit that stores data including score data which represents a music piece, and a music reproduction unit that can reproduce a music piece in association with the signal, the medium containing program instructions executable by the central processing unit for causing the telephony terminal apparatus to perform a method comprising the steps of:

- allotting the music reproduction unit with a score data memory that has a limited space for storing a part of score data, which represents a music piece and which can be provided from the memory unit;
- providing the music reproduction unit with an interface that can be operated to load the score data from the memory unit into the score data memory;
- providing the music reproduction unit with a tone generator of a frequency modulation type settable with parameters for generating harmonics by frequency modulation to synthesize a tone;
- sequentially retrieving the score data from the score data memory for setting the tone generator with the parameters according to the retrieved score data; and
- detecting when a vacant area is created in the limited space of the score data memory upon sequential retrieval of the score data for operating the interface to load another part of the score data into the vacant area, thereby enabling the tone generator to continue the synthesizing of the tones of the music piece.

15. A machine readable medium for use in a music reproducing apparatus having a processor inside a telephony terminal apparatus having a telephony function of transmitting a signal to a remote location and receiving a signal from the remote location, the music reproducing being used to reproduce a music piece in association with the telephony function, the medium containing program instructions executable by the processor for causing the music reproducing apparatus to perform a method comprising the steps of:

- providing a score data memory that has a limited space capable of storing a part of score data, which represents a music piece and which can be provided from a data source of the telephony terminal apparatus;

operating an interface to load the score data from the data source into the score data memory;

setting a tone generator with a variable parameter derived from the score data for sequentially generating tones of the music piece;

sequentially retrieving the score data from the score data memory so as to set the tone generator with the variable parameter according to the retrieved score data; and detecting when a vacant area is created in the limited space of the score data memory upon sequential retrieval of the score data for operating the interface to load another part of the score data into the vacant area, thereby enabling the tone generator to continue the generating of the tones of the music piece.

16. A machine readable medium for use in a telephony terminal apparatus having a processor that processes data to execute a task with a telephony function of transmitting a signal to a remote location and receiving the signal from the remote location, a memory device that stores data including score data representative of a music piece and a music reproduction device that operates according to the score data under control by the processor to reproduce a music piece in association with the task, the medium containing program instructions executable by the processor for causing the telephony terminal apparatus to perform a method comprising the steps of:

allotting the music reproduction device with a score data memory that has a limited space capable of storing a part of the score data, which represents a music piece and which can be provided from the memory device;

operating an interface to load the score data from the memory device into the score data memory;

setting a tone generator of the music reproduction device with a variable parameter derived from the score data for sequentially generating tones of the music piece;

sequentially retrieving the score data from the score data memory so as to set the tone generator with the variable parameter according to the retrieved score data; and notifying the processor when a vacant area is created in the limited space of the score data memory upon sequential retrieval of the score data, so that the processor operates the interface to load another part of the score data from the memory device into the vacant area of the limited space of the score data memory, thereby enabling the tone generator to continue the generating of the tones of the music piece.

17. A music reproducing apparatus for use in a telephony terminal apparatus having a telephony function of transmitting a signal to a remote location and receiving a signal from the remote location, the music reproducing apparatus being used to reproduce a music piece in association with the telephony function, and comprising:

a timbre data memory that has a limited capacity for storing timbre data corresponding to a predetermined number of timbres;

an interface that can be operated to transfer the timbre data from a data source to the timbre data memory so that the timbre data memory stores the transferred timbre data;

a score data memory that stores score data representing a music piece;

a tone generator that is set with tone generating parameters derived from the score data stored in the score data memory and the timbre data stored in the timbre data memory for generating tones of the music piece; and a performance controller that sets the tone generator with the tone generating parameters according to the stored score data for enabling the tone generator to generate tones of the music piece represented by the score data and the timbre data.

18. The music reproducing apparatus according to claim 17, further including an index decoder that receives index data from the interface, the index data indicating that the timbre data is to be transferred to the timbre data memory from the data source, and then the index decoder decodes the received index data to output an instruction to the timbre data memory to write therein the timbre data while the interface is operated to transfer the timbre data to the timbre data memory.

19. A method of reproducing a music piece in a telephony terminal apparatus having a telephony function of transmitting a signal to a remote location and receiving a signal from the remote location, comprising the steps of:

transferring timbre data from a data source of the telephony terminal apparatus to a timbre data memory through an interface, and storing the transferred timbre data in the timbre data memory, the timbre data memory having a limited capacity capable of storing the timbre data corresponding to a predetermined number of timbres;

reading out score data representing a music piece from a score data memory;

setting a tone generator with the timbre data stored in the timbre data memory for generating tones of the music piece; and setting the tone generator with tone generating parameters according to the read score data for enabling the tone generator to generate tones of the music piece represented by the score data and the timbre data in association with the telephony function.

20. A machine readable medium for use in a music reproduction apparatus capable of reproducing a musical piece in a telephony terminal apparatus having a processor and a telephony function of transmitting a signal to a remote location and receiving a signal from the remote location, the medium containing program instructions executable by the processor for causing the music reproduction apparatus to perform a method comprising the steps of:

transferring timbre data from a data source of the telephony terminal apparatus to a timbre data memory through an interface, and storing the transferred timbre data in the timbre data memory, the timbre data memory having a limited capacity capable of storing the timbre data corresponding to a predetermined number of timbres;

reading out score data representing a music piece from a score data memory;

setting a tone generator with the timbre data stored in the timbre data memory for generating tones of the music piece; and setting the tone generator with tone generating parameters according to the read score data for enabling the tone generator to generate tones of the music piece represented by the score data and the timbre data in association with the telephony function.

21. A telephony terminal apparatus comprising:

a processor that processes data to execute a task with a telephony function of transmitting a signal to a remote location and receiving a signal from the remote location;

a memory device that stores data including music data including timbre data and score data to represent music pieces; and a music reproduction device that operates according to the music data under control by the processor to reproduce a music piece in association with the task executed by the processor, wherein the music reproduction device includes:

a timbre data memory that has a limited capacity for storing transferred timbre data corresponding to a predetermined number of timbres;

an interface that can be operated to transfer the timbre data from the memory device to the timbre data memory so that the timbre data memory stores the transferred timbre data;

a score data memory that stores the score data representing a music piece;

a tone generator that is set with tone generating parameters derived from the score data stored in the score data memory and the transferred timbre data stored in the timbre data memory for generating tones of the music piece; and a performance controller that sets the tone generator with the tone generating parameters according to the score data stored in the score data memory for enabling the tone generator to generate tones of the music piece represented by the score data and the timbre data.

22. The telephony terminal apparatus according to claim 21, wherein the music reproduction device further includes an index decoder that receives index data from the interface, the index data indicating that the timbre data is to be transferred to the timbre data memory from the memory device, and then the index decoder decodes the received index data to output an instruction to the timbre data memory to write therein the timbre data while the interface is operated to transfer the timbre data to the timbre data memory.

23. A method of reproducing a music piece in a telephony terminal apparatus having a memory device, a music reproduction device, and a telephony function of transmitting a signal to a remote location and receiving a signal from the remote location, comprising the steps of:

storing data in the memory device, the data including music data comprised of timbre data and score data to represent music pieces;

transferring the timbre data from the memory device of the telephony terminal apparatus to a timbre data memory of the music reproduction device through an interface, and storing the transferred timbre data in the timbre data memory, the timbre data memory having a limited capacity capable of storing the transferred timbre data corresponding to a predetermined number of timbres;

reading out the score data representing a music piece from a score data memory of the music reproduction device;

setting a tone generator of the music reproduction device with the transferred timbre data stored in the timbre data memory for generating tones of the music piece; and setting the tone generator with tone generating parameters according to the read score data for enabling the tone generator to generate tones of the music piece represented by the score data and the transferred timbre data in association with the telephony function.

24. A machine readable medium for use in a telephony terminal apparatus having a processor, a memory device, a music reproduction device and a telephony function of transmitting a signal to a remote location and receiving a signal from the remote location, the medium containing program instructions executable by the processor for causing the telephony terminal apparatus to perform a method comprising the steps of:

storing data in the memory device, the data including music data comprised of timbre data and score data to represent music pieces;

transferring the timbre data from the memory device of the telephony terminal apparatus to a timbre data memory of the music reproduction device through an interface, and storing the transferred timbre data in the timbre data memory, the timbre data memory having a limited capacity capable of storing the transferred timbre data corresponding to a predetermined number of timbres;

reading out the score data representing a music piece from a score data memory of the music reproduction device;

setting a tone generator of the music reproduction device with the transferred timbre data stored in the timbre data memory for generating tones of the music piece; and setting the tone generator with tone generating parameters according to the read score data for enabling the tone generator to generate tones of the music piece represented by the score data and the transferred timbre data in association with the telephony function.

25. A method of reproducing a music piece by a telephony terminal apparatus having a communication unit that transmits a signal to a remote location and receives a signal from the remote location, a memory unit that stores data including score data which represents a music piece, and a music reproduction unit that can reproduce a music piece in association with the signal, the method comprising the steps of:

operating an interface of the music reproduction unit to load a part of the score data from the memory unit into a score data memory of the music reproduction unit so as to store the loaded score data in the score data memory, the score data memory having a limited space capable of storing the part of the score data;

sequentially retrieving the score data from the score data memory for setting a tone generator of a frequency modulation type provided in the music reproduction unit with parameters according to the retrieved score data;

generating harmonics by frequency modulation of the tone generator according to the set parameters so as to synthesize a tone of the music piece based on the retrieved score data; and detecting when a vacant area is created in the limited space of the score data memory upon sequential retrieval of the score data for operating the interface to load another part of the score data into the vacant area, thereby enabling the tone generator to continue the synthesizing of the tones of the music piece.

26. A method of reproducing a music piece in a telephony terminal apparatus having a telephony function of transmitting a signal to a remote location and receiving a signal from the remote location, comprising the step of:

operating an interface to load a part of score data, which represents a music piece, from a data source of the telephony terminal apparatus into a score data memory so as to store the loaded score data in the score data memory, the score data memory having a limited space capable of storing the part of the score data;

sequentially retrieving the score data from the score data memory so as to set a tone generator with a variable parameter derived from the retrieved score data for sequentially generating tones of the music piece in association with the telephony function; and detecting when a vacant area is created in the limited space of the score data memory upon sequential retrieval of the score data for operating the interface to load another part of the score data into the vacant area, thereby enabling the tone generator to continue the generating of the tones of the music piece.

27. A method of reproducing a music piece from a telephony terminal apparatus having a processor that processes a data to execute a task with a telephony function of transmitting a signal to a remote location and receiving a signal from the remote location, a memory device that stores data including score data representative of a music piece and a music reproduction device that operates according to the score data under control by the processor to reproduce the music piece in association with the task, the method comprising the steps of:

operating an interface of the music reproduction device to load a part of the score data from the memory device of the telephony terminal apparatus into a score data memory of the music reproduction device so as to store the loaded score data in the score data memory, the score data memory having a limited space capable of storing the part of the score data;

sequentially retrieving the score data from the score data memory so as to set a tone generator of the music reproduction device with a variable parameter derived from the retrieved score data for sequentially generating tones of the music piece in association with the telephony function; and notifying the processor when a vacant area is created in the limited space of the score data memory upon sequential retrieval of the score data, so that the processor operates the interface to load another part of the score data from the memory device into the vacant area of the limited space of the score data memory, thereby enabling the tone generator to continue the generating of the tones of the music piece.

28. A machine readable medium for use in a telephony terminal apparatus having a processing unit, a communication unit that transmits a signal to a remote location and receives a signal from the remote location, a memory unit that stores data including score data which represents a music piece, and a music reproduction unit that can reproduce a music piece in association with the signal, the medium containing program instructions executable by the processing unit for causing the telephony terminal apparatus to perform a method comprising the steps of:

operating an interface of the music reproduction unit to load a part of the score data from the memory unit into a score data memory of the music reproduction unit so as to store the loaded score data in the score data memory, the score data memory having a limited space capable of storing the part of the score data;

sequentially retrieving the score data from the score data memory for setting a tone generator of a frequency modulation type provided in the music reproduction unit with parameters according to the retrieved score data;

generating harmonics by frequency modulation of the tone generator according to the set parameters so as to synthesize a tone of the music piece based on the retrieved score data; and detecting when a vacant area is created in the limited space of the score data memory upon sequential retrieval of the score data for operating the interface to load another part of the score data into the vacant area, thereby enabling the tone generator to continue the synthesizing of the tones of the music piece.

29. A machine readable medium for use in reproducing a music piece by a telephony terminal apparatus having a processor and a telephony function of transmitting a signal to a remote location and receiving a signal from the remote location, the medium containing program instructions executable by the processor for causing the telephony terminal apparatus to perform a method comprising the step of:

operating an interface to load a part of score data which represents a music piece from a data source of the telephony terminal apparatus into a score data memory so as to store the loaded score data in the score data memory, the score data memory having a limited space capable of storing the part of the score data;

sequentially retrieving the score data from the score data memory so as to set a tone generator with a variable parameter derived from the retrieved score data for sequentially generating tones of the music piece in association with the telephony function; and detecting when a vacant area is created in the limited space of the score data memory upon sequential retrieval of the score data for operating the interface to load another part of the score data into the vacant area, thereby enabling the tone generator to continue the generating of the tones of the music piece.

30. A machine readable medium for use in reproducing a music piece from a telephony terminal apparatus having a processor that processes a data to execute a task with a telephony function of transmitting a signal to a remote location and receiving a signal from the remote location, a memory device that stores data including score data representative of a music piece, and a music reproduction device that operates according to the score data under control by the processor to reproduce a music piece in association with the task, the medium containing program instructions executable by the processor for causing the telephony terminal apparatus to perform a method comprising the steps of:

operating an interface of the music reproduction device to load a part of the score data from the memory device of the telephony terminal apparatus into a score data memory of the music reproduction device so as to store the loaded score data in the score data memory, the score data memory having a limited space capable of storing the part of the score data;

sequentially retrieving the score data from the score data memory so as to set a tone generator of the music reproduction device with a variable parameter derived from the retrieved score data for sequentially generating tones of the music piece in association with the telephony function; and notifying the processor when a vacant area is created in the limited space of the score data memory upon sequential retrieval of the score data, so that the processor operates the interface to load another part of the score data from the memory device into the vacant area of the limited space of the score data memory, thereby enabling the tone generator to continue the generating of the tones of the music piece.

* * * * *